(12) United States Patent
Mikuni

(10) Patent No.: US 9,594,436 B2
(45) Date of Patent: Mar. 14, 2017

(54) THREE-DIMENSIONAL IMAGE DISPLAY DEVICE, CURSOR DISPLAY METHOD THEREFOR, AND COMPUTER PROGRAM

(71) Applicant: NEC CASIO MOBILE COMMUNICATIONS, LTD., Kanagawa (JP)

(72) Inventor: Shin Mikuni, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 14/399,775

(22) PCT Filed: May 8, 2013

(86) PCT No.: PCT/JP2013/062927
§ 371 (c)(1),
(2) Date: Nov. 7, 2014

(87) PCT Pub. No.: WO2013/168736
PCT Pub. Date: Nov. 14, 2013

(65) Prior Publication Data
US 2015/0130713 A1    May 14, 2015

(30) Foreign Application Priority Data
May 9, 2012    (JP) ................................. 2012-107594

(51) Int. Cl.
*G06F 3/033*    (2013.01)
*H04N 13/04*    (2006.01)
(Continued)

(52) U.S. Cl.
CPC ............... *G06F 3/033* (2013.01); *G09G 5/08* (2013.01); *H04N 13/004* (2013.01);
(Continued)

(58) Field of Classification Search
CPC ......... H04N 13/004–13/0066; H04N 13/0239; H04N 13/0402–13/0497; G09G 5/08; G06F 3/033
See application file for complete search history.

(56) References Cited

U.S. PATENT DOCUMENTS 6,225,979 B1 *  5/2001  Taima ................. G06F 3/04812
                                             345/157
2003/0174204 A1  9/2003  Otani et al.
(Continued)

FOREIGN PATENT DOCUMENTS

CN    101655747    8/2009
JP    2003-107603    4/2003
(Continued)

OTHER PUBLICATIONS

International Search Report, PCT/JP2013/062927, Jun. 18, 2013.
(Continued)

*Primary Examiner* — Kathy Wang-Hurst
*Assistant Examiner* — Peijie Shen
(74) *Attorney, Agent, or Firm* — Young & Thompson

(57) ABSTRACT

A three-dimensional image display device includes: a cursor drawing control unit controlling cursor drawing in a first mode in which a cursor is displayed on an image for one of left and right eyes and no cursor is displayed on an image for the other eye and cursor drawing in a second mode in which a cursor is displayed with a depth by using parallax of images for both left and right eyes; and an image analysis unit performing, when cursor drawing is switched from the first mode to the second mode, image matching on the basis of a position indicated by a cursor on an image for the one eye to search for a corresponding position on an image for the other eye and obtaining a cursor display position on the image for the other eye.

15 Claims, 13 Drawing Sheets

(51) Int. Cl.
*H04N 13/00* (2006.01)
*G09G 5/08* (2006.01)
*H04N 13/02* (2006.01)
*G09G 3/00* (2006.01)

(52) U.S. Cl.
CPC ..... *H04N 13/0409* (2013.01); *H04N 13/0497* (2013.01); *G09G 3/003* (2013.01); *G09G 2354/00* (2013.01); *H04N 13/0239* (2013.01)

(56) References Cited

U.S. PATENT DOCUMENTS

| | | | | |
|---|---|---|---|---|
| 2011/0083106 A1* | 4/2011 | Hamagishi | ............... | G06F 3/017 715/836 |
| 2011/0122234 A1* | 5/2011 | Kikkawa | ............... | G06T 7/0022 348/51 |
| 2012/0068079 A1* | 3/2012 | Agano | ................ | G01V 5/0058 250/393 |
| 2013/0002661 A1 | 1/2013 | Tanaka et al. | | |

FOREIGN PATENT DOCUMENTS

| | | |
|---|---|---|
| JP | 2003-284098 | 10/2003 |
| JP | 2004-362218 | 12/2004 |
| JP | 2011-153995 | 8/2011 |
| WO | WO 2011/114564 | 9/2011 |

OTHER PUBLICATIONS

China Office Action dated Apr. 5, 2016, with English Translation; Application No. 201380023659.2.

Enbo Fang et al., "Realization and Application Research . . . ", Acta Photonica Sinica, vol. 39, No. 4, pp. 605-609, Apr. 2010.

Extended European search report, dated Nov. 16, 2015; Application No. 13787514.2.

* cited by examiner

THREE-DIMENSIONAL IMAGE DISPLAY DEVICE, CURSOR DISPLAY METHOD THEREFOR, AND COMPUTER PROGRAM

TECHNICAL FIELD

Reference to Related Application

This application is based upon and claims the benefit of the priority of Japanese Patent Application No. 2012-107594 filed on May 9, 2012, the disclosure of which is incorporated herein in its entirety by reference thereto.

The present invention relates to a three-dimensional (3D) image display device, a cursor display method therefor, and a computer program. In particular, it relates to a 3D image display device that indicates an operation target object with a cursor in a pseudo 3D display space using binocular parallax.

BACKGROUND

Mobile devices such as mobile phones, smartphones, and game machines have adopted 3D display devices that display 3D images by using binocular parallax. When these 3D display devices are used, there are cases in which an object in the 3D space needs to be indicated. Generally, an object in the 3D space can be indicated by moving a position indication marker such as a cursor or a pointer on an image. Such a position indication marker that uses an arrow or the like on an image for indicating the position of an operation target is called in various ways such as a cursor, a pointer, etc. In the present description, such a position indication marker will be referred to as a cursor. Namely, in the present description, a position indication marker such as a pointer will collectively be referred as a cursor.

Conventional 3D display devices use various methods for indicating an object in the 3D space. These methods can be divided into two kinds.

In a first method, a cursor is also displayed with a depth in the 3D space. To move this cursor, a control operation system in the depth direction is prepared in addition to two-dimensional control in horizontal and vertical directions. In this way, coordinates in the 3D space are directly indicated. For example, FIG. 4 in Patent Literature 1 (PTL 1) discloses moving a pointer (a cursor) in the 3D space by using a key and a switch, more specifically, an arrow key 32 and a Y-axis seesaw switch 31.

A second method is based on the same idea as indicating an object with an operator's finger in the real world. Since the finger is near and the object is far, when the operator focuses on the object, it appears to the operator as if there were two fingers. However, human left and right eyes recognize an object differently (an eye mainly used for recognition will hereinafter be referred to as a dominant eye). Thus, in the second method, an object is determined by using the image of a finger viewed by a dominant eye as a finger pointing in the correct direction.

PTL 2 discloses a 3D object operating method for providing a natural operating environment. According to PTL 2, an object in the line of sight of a dominant eye, which is a right eye or a left eye, is selected as an object corresponding to a cursor. As disclosed in FIG. 5 in PTL 2, if the operator sees with his/her right eye only, it appears to the operator that a cursor position 506 overlaps an operating point 502 of an object A (501). In addition, if the operator sees with his/her left eye only, it appears to the operator that the cursor position 506 overlaps an operating point 504 of an object B (503). PTL 2 discloses that the operator selects an operating point viewed by the operator's dominant eye as a desired operating point of the operator. For example, in the example in FIG. 5 in PTL 2, if the right eye is the dominant eye of the operator, the operating point 502 is selected as a desired operating point of the operator. If the left eye is the dominant eye, the operating point 504 is selected as a desired operating point of the operator.

In addition, PTL 3 discloses adjusting the stereoscopic effect of a generated image and changing the appearance of the object space by adjusting the distance between the left eye viewpoint and the right eye viewpoint and by changing the depth of the line of sight.

[PTL 1]
Japanese Patent Kokai Publication No. 2011-153995A
[PTL 2]
Japanese Patent Kokai Publication No. 2004-362218A
[PTL 3]
Japanese Patent Kokai Publication No. 2003-107603A

SUMMARY

The following analysis has been given by the present inventor. When indicating an operation target object with a cursor in a pseudo 3D display space using binocular parallax, the first method described in Background can be used. However, since a 3D display device only performs pseudo 3D space display (more specifically, since the focal position of the eyes does not change whether an object is near or far), the operator cannot feel that he/she is watching a 3D image physiologically sufficiently and it is very difficult to adjust the depth direction.

In the second method, a cursor is also displayed and viewed by the non-dominant eye. Thus, since the operator sees two duplicate images of a cursor or an object, it is difficult to perform a position adjustment operation.

The present invention has been made in view of the above circumstances, and it is an object of the present invention to provide a cursor display environment that enables easy position adjustment and that is easily viewable in a pseudo 3D space.

According to a first aspect of the present invention, there is provided a three-dimensional image display device using binocular parallax, the device comprising: a cursor drawing control unit controlling cursor drawing in a first mode in which a cursor is displayed on an image for one of left and right eyes and no cursor is displayed on an image for the other eye and cursor drawing in a second mode in which a cursor is displayed with a depth by using parallax of images for both left and right eyes; and an image analysis unit performing, when cursor drawing is switched from the first mode to the second mode, image matching on the basis of a position indicated by a cursor on an image for the one eye to search for a corresponding position on an image for the other eye and obtaining a cursor display position on the image for the other eye.

According to a second aspect of the present invention, there is provided a cursor display method for a three-dimensional image display device using binocular parallax, the method comprising: detecting, when cursor drawing is switched from a first mode in which a cursor is displayed on an image for one of left and right eyes and no cursor is displayed on an image for the other eye to a second mode in which a three-dimensional cursor is displayed by using parallax of images for both left and right eyes, a position of an image indicated by the cursor on the image for the one eye; searching for a corresponding position on an image for the other eye by performing image matching; and displaying a cursor on the image for the other eye on the basis of the position searched for.

This method is associated with a certain machine, namely, with a three-dimensional image display device using binocular parallax.

According to a third aspect of the present invention, there is provided a computer program, causing a computer of a three-dimensional image display device using binocular parallax to perform cursor display processing, the computer program executing: display processing in a first mode for displaying a cursor on an image for one of left and right eyes and hiding a cursor an image for the other eye; display processing in a second mode for displaying a cursor with a depth by using parallax of images for both left and right eyes; and processing for performing, when cursor display is switched from the first mode to the second mode, image matching on the basis of a position indicated by a cursor on an image for the one eye to search for a corresponding position on an image for the other eye, obtaining a cursor display position on the image for the other eye, and switching to display in the second mode.

This computer program can be recorded in a computer-readable storage medium. The storage medium may be a non-transient storage medium such as a semiconductor memory, a hard disk, a magnetic recording medium, or an optical recording medium. The present invention can be embodied as a computer program product.

According to each of the aspects of the present invention, it is possible to provide a cursor display environment that enables easy position adjustment and that is easily viewable in a pseudo 3D display using binocular parallax.

PREFERRED MODES

Figure 1A:
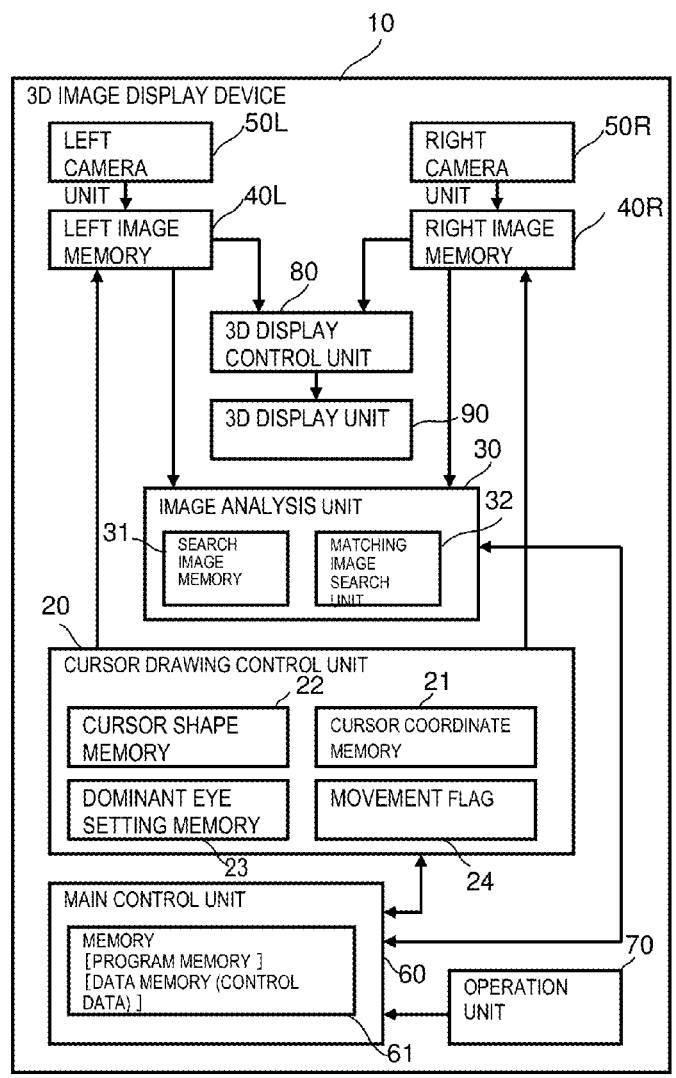
FIGS. 1A-1C are block diagrams illustrating an overall configuration of a 3D image display device according to a first exemplary embodiment.

An outline of an exemplary embodiment of the present invention will be described. The reference characters in the following outline are merely used as examples to facilitate understanding of the present invention, not to limit the present invention to the illustrated modes.

Figure 1B:
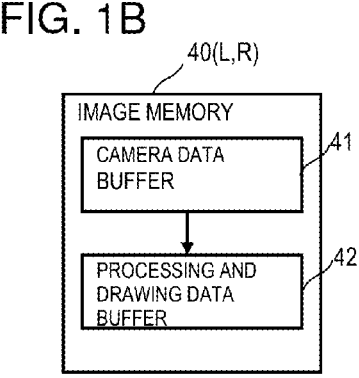
Figure 1C:
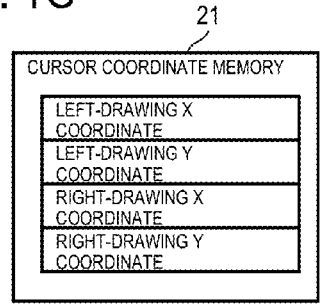

As illustrated in FIGS. 1A-1C, a 3D image display device (10) according to an exemplary embodiment disclosed in the present application includes a cursor drawing control unit (20) controlling cursor drawing in a first mode in which a cursor is displayed on an image for one of left and right eyes and no cursor is displayed on an image for the other eye and cursor drawing in a second mode in which a cursor is displayed with a depth by using parallax of images for both left and right eyes.

For example, in the first mode, a cursor is displayed only for a dominant eye, and in the second mode, a cursor is displayed at a position that matches the depth of an object indicated by the cursor. Thus, two cursor images do not appear in either mode.

The 3D image display device (10) according to an exemplary embodiment further includes an image analysis unit (30) performing, when cursor drawing is switched from the first mode to the second mode, image matching on the basis of a position indicated by a cursor on an image for the one eye to search for a corresponding position on an image for the other eye and obtaining a cursor display position on the image for the other eye.

Since the cursor display position on the image that has not displayed a cursor is obtained by performing matching between the left-eye image and the right-eye image, a cursor having a depth that matches the depth of an object indicated by the cursor can be displayed relatively easily. For example, when an operator is moving a cursor, the cursor is displayed in the first mode. After the position of the cursor is determined, the cursor is displayed in the second mode. In this way, it is possible to provide a cursor display environment that enables easy position adjustment and that is easily viewable in a pseudo 3D display using binocular parallax.

Figure 2A:
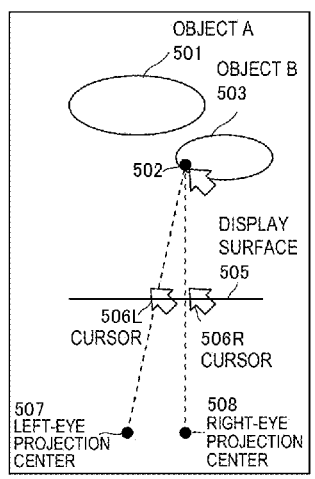
FIG. 2A illustrates a virtual depth position according to the first exemplary embodiment.
Figure 2B:
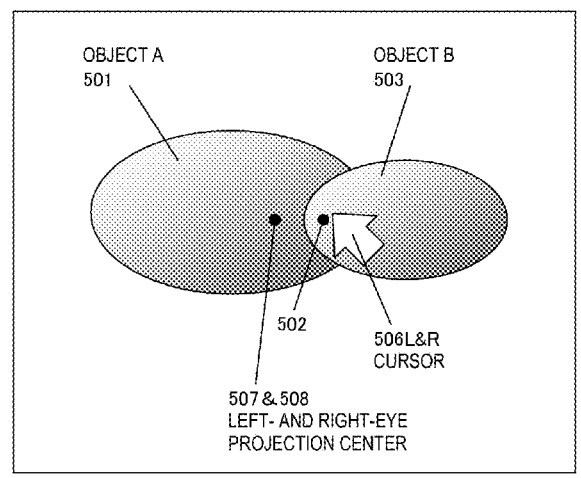
FIG. 2B illustrates an actual display screen according to the first exemplary embodiment.

Hereinafter, a cursor display example according to an exemplary embodiment will be described in more detail. FIG. 2A illustrates a virtual depth position in cursor display according to an exemplary embodiment and FIG. 2B illustrates an actual display screen.

In FIG. 2A, while an image is actually displayed on a display surface 505, a right eye views an image that is viewed from a right-eye projection center 508 and a left eye views an image that is viewed from a left-eye projection center 507. Namely, the left and right eyes view images from their respective viewpoints. When an operator views an object B(503) and an object A(501) with both left and right eyes, because of the binocular parallax, it appears to the operator that the object B(503) is located farther from the display surface 505 and that the object A(501) is located even farther from the object B(503).

In the first mode according to an exemplary embodiment, a cursor is displayed on an image for one of left and right eyes and no cursor is displayed on an image for the other eye. A dominant eye can be selected as the eye for which the cursor is displayed. For example, if the dominant eye is the left eye, a cursor 506L is displayed on the left-eye image and a cursor 506R is not displayed on the right-eye image.

Namely, if the operator views the image with his/her left eye alone, the operator can view the cursor 506L indicating the operating point 502 of the object B, in addition to the objects A and B. However, if the operator views the image with his/her right eye alone, while the operator can view the objects A and B, the operator cannot view the cursor 506R. Thus, if the operator views the image with both his/her left and right eyes, the operator can view the cursor 506L indicating the operating point 502 of the object B. In the first mode, since a cursor is displayed only on an image for one eye, the operator cannot feel that the cursor has a depth. However, the left and right eyes do not view two cursors located at different positions.

Next, in the second mode according to an exemplary embodiment, the cursor 506L is displayed on the left-eye image and the cursor 506R is displayed on the right-eye image. Namely, because of the binocular parallax, it appears to the operator that the cursors 506L and 506R are located at the operating point 502 of the object B indicated by the cursors. Since the depth of the object B indicated by the cursors matches the depth of the cursors 506L and 506R, when the operator focuses on the cursor(s) with both eyes, the operator does not view two images in duplicate (or as overlapping) of the object B in the background. In addition, when the operator focuses on the object B with both eyes, the operator does not view two cursor images in duplicate (or as overlapping).

Namely, as illustrated in FIG. 2B, either in the first or second mode, it appears to the operator that a cursor is indicating the operating point 502 of the object B and that there is no other cursor image in duplicate anywhere else. In particular, when the operator moves a cursor, the cursor can be displayed in the first mode, and when the operator does not move the cursor, the cursor can be displayed in the second mode.

Figure 2C:
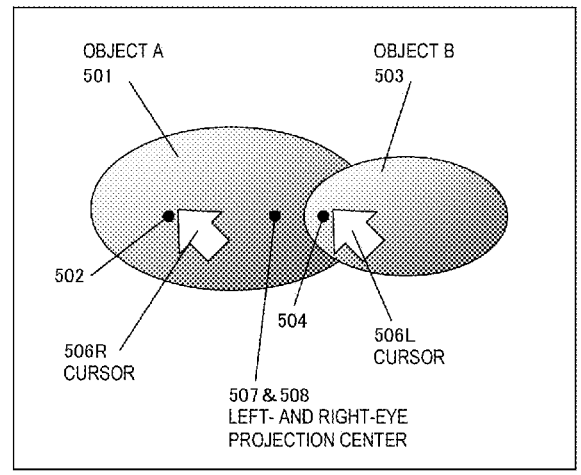
FIG. 2C illustrates an actual display screen according to PTL 2.

For comparison, FIG. 2C illustrates an actual display screen in FIG. 5 in PTL 2. Namely, in the example in FIG. 5 in PTL 2, when the operator views an image with his/her left eye alone, it appears to the operator that the head (tip) of a cursor 506L is indicating an operating point 504 of an object B. In contrast, when the operator views an image with his/her right eye alone, it appears to the operator that the head (tip) of a cursor 506R is indicating an operating point 502 of an object A. PTL 2 discloses selecting the position of a cursor for an operator's dominant eye, which is a left eye or a right eye, as a desired operating point of the operator. Namely, since two operating points 502 and 504 (i.e., positions where the cursor heads (tips) appear as overlapping) exist, if the operator focuses on an object in the background, it appears to the operator that two cursor images are displayed as overlapping. If the operator focuses on a cursor, it appears to the operator that two background images are displayed as overlapping. Therefore, even if the operator selects the position of a cursor for a dominant eye as a desired operating point of the operator, it is conceivable that position adjustment cannot easily be performed and the cursor is not easily viewable.

In contrast, according to an exemplary embodiment disclosed in the present application, either in the first or second mode, only one operating point 502 exists (a position where the cursor head appears as overlapping). Thus, since the operator does not view two cursor or background images, a cursor display environment that enables easy position adjustment and that is easily viewable can be provided.

Namely, according to an exemplary embodiment, since only one cursor is displayed for an object on which an operator focuses, the operator can perform an operation easily. In addition, as will be described below, since a cursor having a matching depth is displayed by performing a search on the basis of an image feature, the spatial position of the cursor is located at the point 502 in FIG. 2A. Namely, the spatial position can immediately be checked visually. In addition, since the spatial coordinates are uniquely determined, the 3D coordinates in the real space can also be acquired.

Hereinafter, specific exemplary embodiments realizing the above cursor display will be described in more detail with reference to the drawings.

First Exemplary Embodiment

FIG. 1A is a block diagram illustrating an overall configuration of a 3D image display device according to a first exemplary embodiment. A configuration of a 3D image display device 10 according to the first exemplary embodiment will be described with reference to FIG. 1A. While FIGS. 1A-1C illustrate the 3D image display device 10 as a portable terminal device, the 3D image display device 10 is not limited to a portable terminal device. Namely, an arbitrary device may be used as the 3D image display device 10, as long as the device can display a pseudo 3D image by using binocular parallax. The 3D image display device 10 includes two cameras, which are a left camera unit 50L and a right camera unit 50R. The left and right camera units 50L and 50R are cameras for capturing left- and right-eye images, respectively. The left camera unit 50L and the right camera unit 50R are connected to a left image memory 40L and a right image memory 40R, respectively. The image captured by the left camera unit 50L is stored in the left image memory 40L and the image captured by the right camera unit 50R is stored in the right image memory 40R.

In addition, the image memories 40L and 40R can be written by a cursor drawing control unit 20. By writing cursor shape data over an image, a cursor can be superimposed on the image. The image data stored in the left image memory 40L and the right image memory 40R is transmitted to a 3D display control unit 80, and the 3D display control unit 80 displays a pseudo 3D image on a 3D display unit 90. The user can view the image displayed on the 3D display unit 90 as a 3D image.

The cursor drawing control unit 20 is connected to the left image memory 40L and the right image memory 40R and controls cursor drawing with respect to the left image memory 40L and the right image memory 40R. The cursor drawing control unit 20 includes a cursor coordinate memory 21, a cursor shape memory 22, a dominant eye setting memory 23, and a movement flag 24. As illustrated in FIG. 1C, the cursor coordinate memory 21 stores the X- and Y-coordinates of the cursor drawn in the left image memory 40L and the X- and Y-coordinates of the cursor drawn in the right image memory 40R. The cursor shape memory 22 stores the shape of the cursor to be drawn. The dominant eye setting memory 23 stores information indicating a left eye or a right eye used as the dominant eye. The movement flag 24 stores information indicating whether the cursor is moving.

When cursor drawing is switched from the first mode in which a cursor is displayed only on a left- or right-eye image to the second mode in which a cursor is displayed on each of the left- and right-eye images, an image analysis unit 30 performs image matching on the basis of a position indicated by a cursor on the cursor display image to search for a corresponding position on the non-cursor display image and obtains a cursor display position on the non-cursor display image. The image analysis unit 30 includes a search image memory 31 and a matching image search unit 32. The image analysis unit 30 is connected to the left image memory 40L and the right image memory 40R. The image analysis unit 30 can extract a portion of an image in the left image memory 40L or the right image memory 40R and store the extracted portion in the search image memory 31. The image analysis unit 30 can access the entire image memory 40L or 40R and search for a location where an image similar to the image stored in the search image memory 31 exists. Namely, the search image memory 31 stores an image including a portion relating to a cursor displayed on the basis of the left image memory 40L or the right image memory 40R, and the matching image search unit 32 can search the image memory that is not displaying a cursor for a location where a similar image exists.

Since existing techniques relating to image compression or various types of image processing can be used for this search, detailed description of the search will be omitted. In particular, means for performing such processing at high speed by using hardware have already been developed. Thus, the search processing can be performed at high speed.

A main control unit 60 includes a memory 61 which stores programs and control data for controlling the cursor drawing control unit 20 and the image analysis unit 30 and which are used as a work data memory. An operation unit 70 receives operations from a user. The main control unit 60 can control the entire 3D image display device 10 on the basis of input received from the operation unit 70.

In addition, as illustrated in FIG. 1B, each of the left image memory 40L and the right image memory 40R in FIG. 1A may have a double buffer configuration of a camera data buffer 41 and a processing and drawing data buffer 42. The camera data buffer 41 stores data forwarded from a corresponding camera and the processing and drawing data buffer 42 performs writing processing. More specifically, after a copy of the forwarded data is made, the processing and drawing data buffer 42 draws and superimposes a cursor image or the like on the copy. In such case, since a cursor operation can be performed while the image from a corresponding camera is stationary, usability can be improved.

Figure 3:
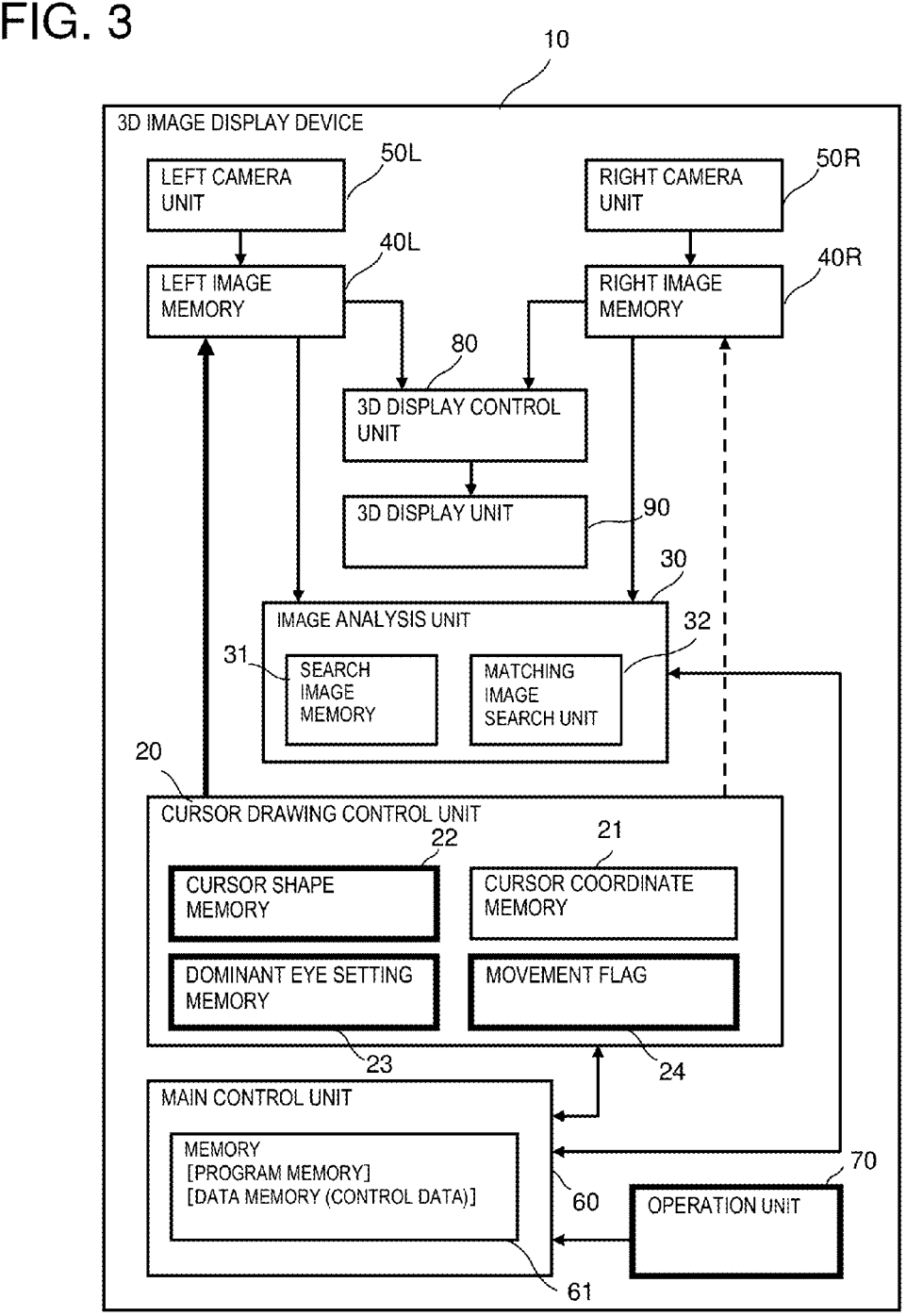
FIG. 3 illustrates an operation of the 3D image display device according to the first exemplary embodiment performed when a cursor is moving.
Figure 4A:
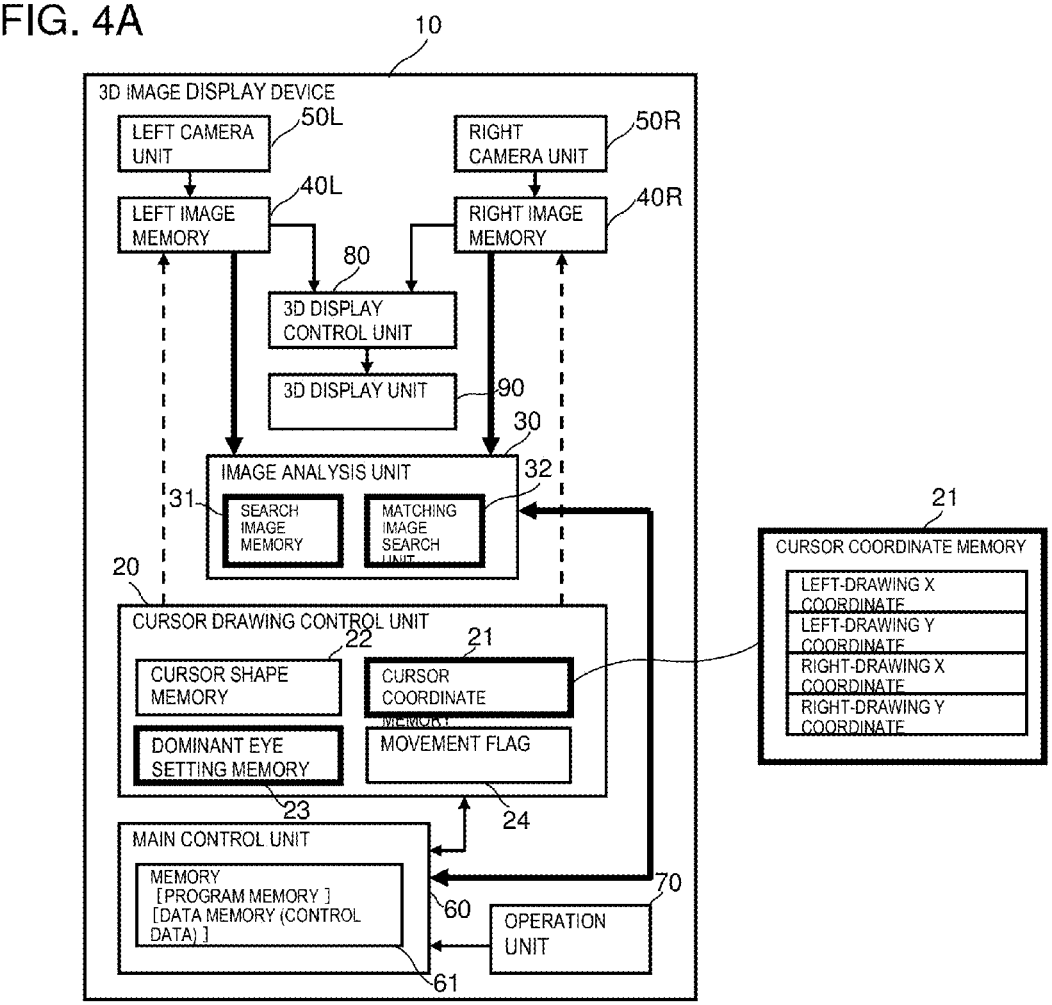
FIGS. 4A and 4B illustrate operation of the 3D image display device according to the first exemplary embodiment performed when the cursor is stopped.
Figure 4B:
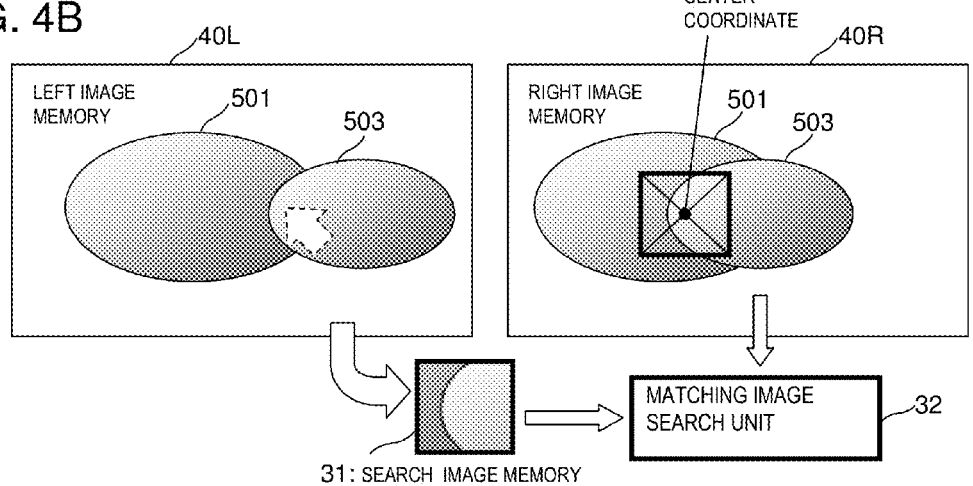
Figure 5A:
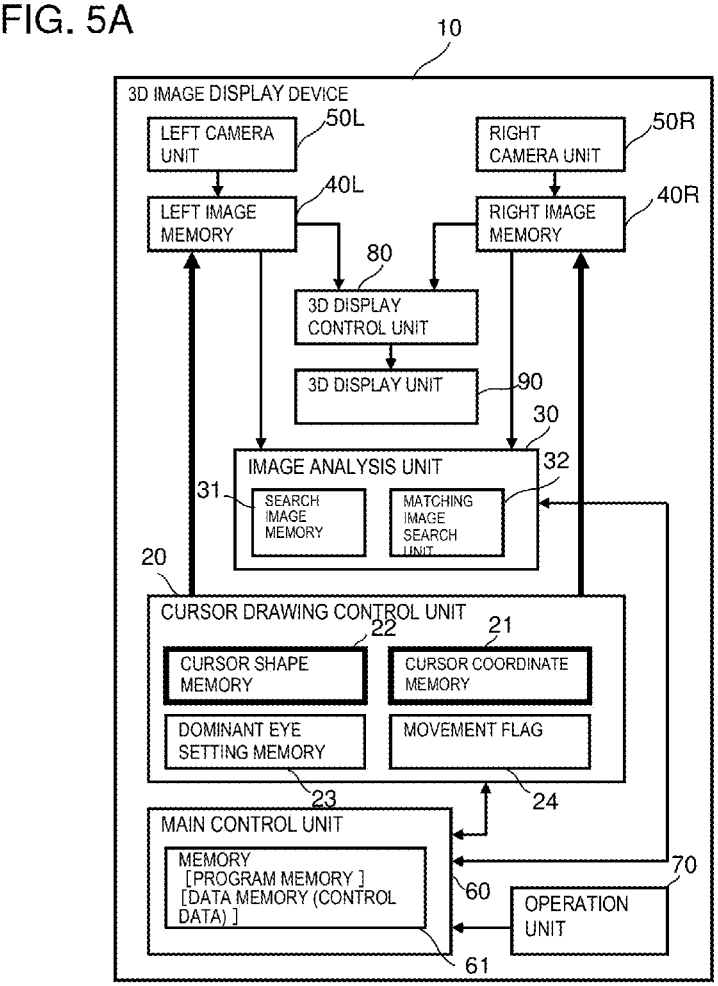
FIGS. 5A-5C illustrate operation of the 3D image display device according to the first exemplary embodiment performed when a 3D cursor is drawn.
Figure 5B:
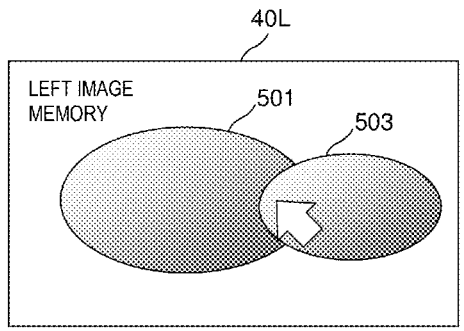
Figure 5C:
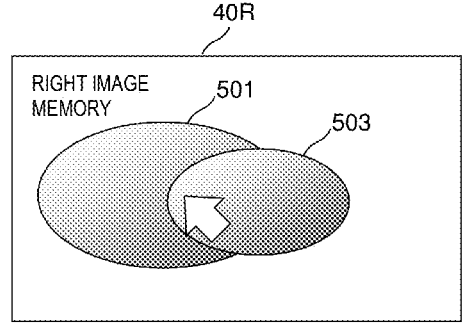
Figure 6A:
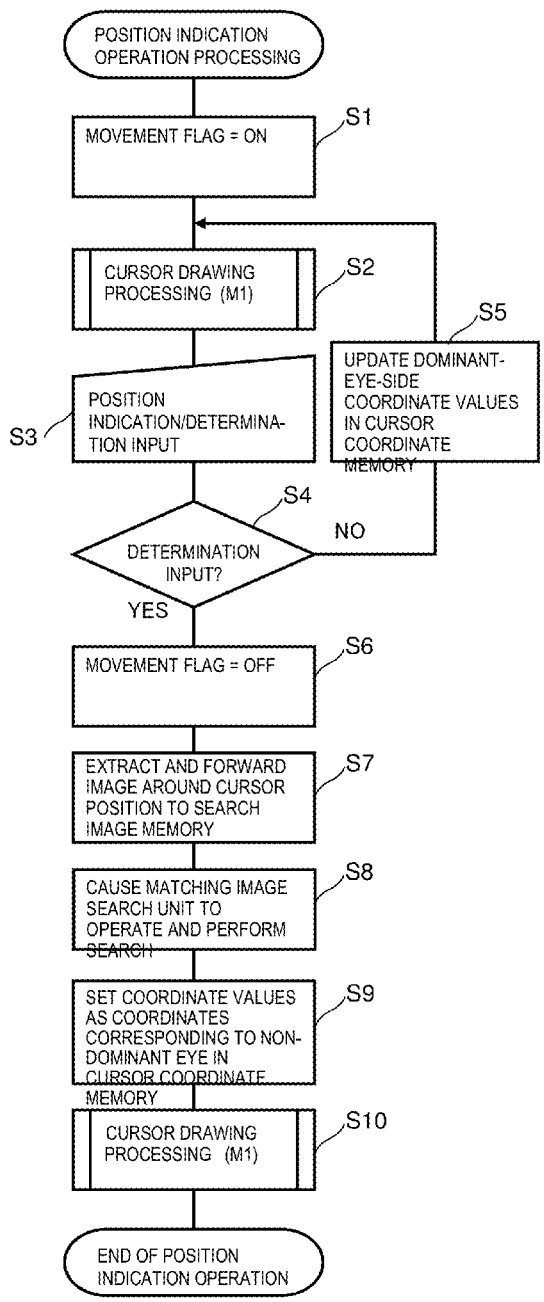
FIGS. 6A and 6B are flowchart illustrating processing according to the first exemplary embodiment.
Figure 6B:
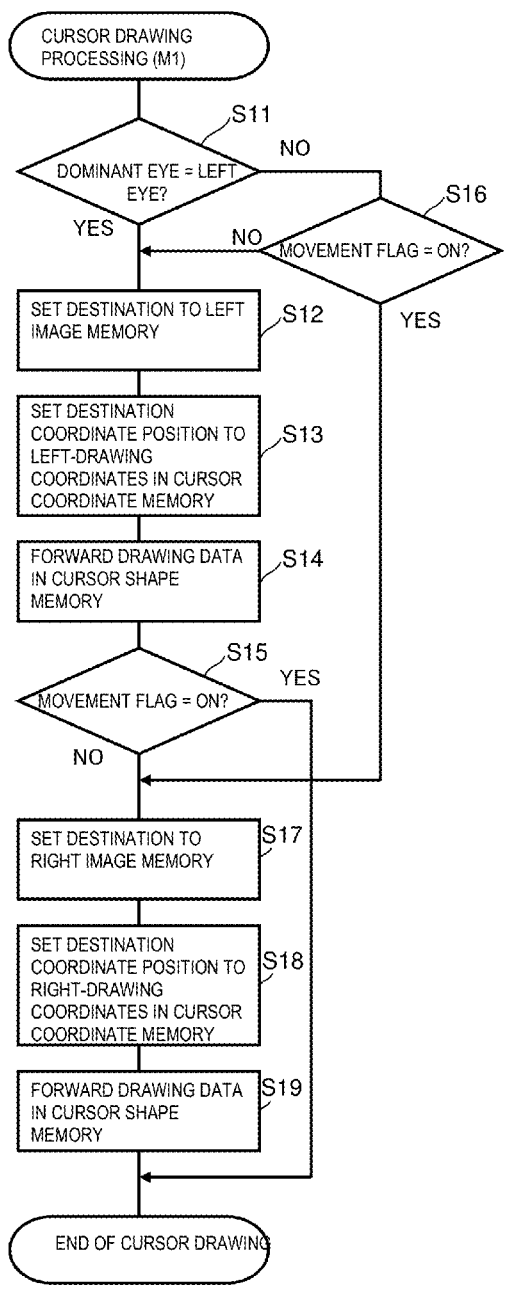

Next, basic operations of the 3D image display device 10 according to the first exemplary embodiment will be described with reference to FIGS. 3 to 6B. FIG. 3 illustrates an operation in the first mode (for example, when a user is performing an operation of indicating the position of a cursor and the cursor is moving). FIGS. 4A and 4B illustrate operation performed when the mode is switched from the first mode to the second mode, for example, after movement of the cursor is ended. FIGS. 5A-5C illustrate operation of displaying a 3D cursor with a depth in the second mode. FIGS. 6A and 6B are flowchart illustrating the processing in FIGS. 3 to 5C.

First, an operation (first mode) performed when a user is performing an operation of indicating the position of a cursor and the cursor is moving will be described with reference to FIG. 3. In FIG. 3, blocks that mainly operate when the cursor is moving and signal lines that are used for main control when the dominant eye is the left eye are indicated by thick lines. In contrast, signal lines that are seldom used for control in such case are indicated by dashed lines. When the cursor is moving, the movement flag 24 is set to ON. When the movement flag 24 is ON, the cursor drawing control unit 20 writes data of the cursor shape memory 22 in the left image memory 40L or the right image memory 40R that is set by the dominant eye setting memory 23. Since FIG. 3 illustrates a case in which the left eye is set in the dominant eye setting memory 23, the cursor drawing control unit 20 writes a cursor symbol only in the left image memory 40L. The cursor drawing control unit 20 does not write a cursor symbol in the right image memory 40R. In the cursor coordinate memory 21, only the left-drawing coordinates are used. The main control unit 60 updates the values of the left-drawing coordinates in accordance with an instruction from the operation unit 70. In this way, while the user is indicating (moving) the position of the cursor, the cursor is displayed only on an image for the dominant eye.

As illustrated in the flowchart in FIG. 6A, when the cursor is moved, the movement flag 24 (see FIG. 1A-1C or 3) is set to ON in step S1. Next, loop processing of steps S2 to S5 is repeated. The processing from steps S1 to S5 is started when a user starts moving a cursor by indicating and dragging the cursor with a pointing device, for example.

In step S2 in FIG. 6A, cursor drawing processing (M1) is performed. FIG. 6B illustrates detailed steps in the cursor drawing processing (M1). In the cursor drawing processing (M1), if the left eye is set as the dominant eye in the dominant eye setting memory 23 (Yes in step S11), steps S12 to S14 are performed. First, the destination of the cursor symbol is set to the left image memory 40L (step S12). Next, the destination coordinate position is set to the left-drawing coordinates in the cursor coordinate memory 21 (see FIG. 1C) (step S13). Next, drawing data in the cursor shape memory 22 is forwarded to the left image memory 40L on the basis of the settings made in steps S12 and S13 (step S14). Since the movement flag 24 is ON (Yes in step S15), the cursor drawing processing (M1) is ended.

If the right eye is set as the dominant eye in the dominant eye setting memory 23 (No in step S11), the operation proceeds to step S16. Since the movement flag 24 is ON (Yes in step S16), steps S17 to S19 are performed. The processing from steps S17 to S19 is the same as the processing from steps S12 to S14, except that the right image memory 40R is used in place of the left image memory 40L and that the destination coordinate position is changed from the left-drawing coordinates to the right-drawing coordinates in the cursor coordinate memory 21. Namely, if the movement flag 24 is ON, cursor drawing is performed only on one of the left image memory and the right image memory, depending on the content of the dominant eye setting memory. Cursor drawing is not performed on the other image memory.

The processing performed while the cursor is moving will be described further with reference to FIG. 6A. If the cursor drawing processing (M1) in step S2 is ended, the main control unit 60 waits for an input from the operation unit 70 to determine whether the user indicates movement of the cursor or whether the user determines the position of the cursor. If the main control unit 60 receives from the operation unit 70 an input of indicating a movement position of a cursor or an input of determining the position of the cursor, the operation proceeds to step S4. In step S4, whether the input from the operation unit 70 is an input of determining the position of the cursor is determined. If the input is for indicating movement of the cursor (No in step S4), the operation proceeds to step S5. In step S5, on the basis of the input from the operation unit 70, the dominant-eye-side coordinate values in the cursor coordinate memory 21 are updated. Next, the operation returns to the cursor drawing processing (M1) in step S2. If the input from the operation unit 70 is determined to be the input of determining the position of the cursor as a result of the determination in step S4, the cursor movement processing is ended. Next, the operation proceeds to processing for switching the cursor display from one-eye display (mode 1) to both-eye display (mode 2).

FIG. 4A illustrates an operation performed when the 3D image display device 10 switches the cursor display from one-eye display (mode 1) to both-eye display (mode 2). Namely, FIG. 4A illustrates an operation of each block in a preparatory stage for displaying a 3D cursor after the user stops the cursor movement (for example, after the user releases the pointing device for moving the cursor). In FIG. 4A, blocks that mainly operate and signal lines used for main control in the preparatory state for displaying a 3D cursor are indicated by thick lines. In addition, signal lines that are seldom used for control in such case are indicated by dashed lines. In addition, FIG. 4B particularly focuses on operations of the left and right image memories 40L and 40R, respectively, and the image analysis unit 30.

In this stage, first, the main control unit 60 controls the image analysis unit 30 and the cursor drawing control unit 20 so that the cursor coordinates (the coordinates on which the head of the cursor is displayed) corresponding to the eye (namely, the eye for which the coordinates that have been updated up until now) set in the dominant eye setting memory 23 are forwarded from the cursor coordinate memory 21 to the image analysis unit 30. In addition, an image around the coordinate position is forwarded to the search image memory 31 in the image analysis unit 30. As illustrated in FIG. 4B, an image around the position of the head of the cursor in the left image memory 40L is forwarded to the search image memory 31.

Next, the matching image search unit 32 is started. The matching image search unit 32 compares the image in the search image memory 31 with the content in the right image memory 40R. The matching image search unit 32 searches the right image memory 40R for an image similar to the image in the search image memory 31. In FIG. 4B, a portion surrounded by a rectangle has been found. Regarding this portion, the positions of the left-side oval shape 501 and the right-side oval shape 503 differ between the left and right eyes. While the density of the left-side oval portion 501 differs from the content in the search image memory 31, since the density of the right-side oval portion 503 that occupies most of the image completely matches, this portion is found as a result of the search. Since the center coordinates of the search result correspond to the head of the cursor in the left image memory 40L, the main control unit 60 sets these coordinates as the right-drawing coordinates in the cursor coordinate memory 21.

The processing for switching the cursor display from one-eye display (mode 1) to both-eye display (mode 2) corresponds to steps S6 to S10 in the flowchart in FIG. 6A. First, the main control unit 60 sets the movement flag 24 to OFF, as a preparation for displaying a 3D cursor (step S6). Next, an image around the position of the cursor corresponding to the image memory that has been updated up until now, which is the left image memory 40L or the right image memory 40R, is extracted and forwarded to the search image memory 31 (step S7). Next, the matching image search unit 32 is caused to perform a search (step S8). Next, on the basis of the search result, coordinate values are set as the coordinates of a cursor for the non-dominant eye in the cursor coordinate memory 21 (step S9). In this way, the left and right drawing coordinates are set in the cursor coordinate memory 21. Next, on the basis of the coordinate values, the cursor drawing processing (M1) is performed (step S10). In the cursor drawing processing (M1) in step S10, the movement flag 24 is set to OFF, not to ON. Thus, regardless of the dominant eye setting, drawing data in the cursor shape memory is forwarded to both of the left image memory and the right image memory, and a cursor is drawn on each of the left- and right-eye images (in FIG. 6B, steps S12 to S14 and S17 to S19 are performed). In this cursor drawing, while a cursor is drawn on each of the left- and right-eye images, since the positions of the cursors drawn differ between the left- and right-eye images, the user can view a cursor as an image that matches the indicated depth.

FIG. 5A illustrates an overall operation performed when the 3D image display device 10 displays a 3D cursor with a depth on each of the left- and right-eye images. FIGS. 5B and 5C illustrate image data in the left image memory 40L and the right image memory 40R when the 3D cursor is displayed. As illustrated in FIG. 5A, the content in the cursor shape memory 22 is forwarded to the left and right image memories 40L and 40R in accordance with the content in the cursor coordinate memory 21. As illustrated in FIGS. 5B and 5C, the coordinates of a displayed cursor differ between the left and right image memories 40L and 40R. However, if the right-side oval shape 503 is seen as a reference, the cursors are displayed at the same position between the left and right image memories 40L and 40R. Thus, the user can view a 3D cursor at a position having a depth that matches that of the object 503 indicated by the cursor.

As described above, the 3D image display device according to the first exemplary embodiment can draw a cursor having a depth that matches that of an object indicated by the cursor, without calculating the 3D coordinates of the cursor. Thus, the 3D image display device requires simple processing and can perform high-speed operations. While the spatial coordinates of the cursor have not been held at this stage, since the display positions of the left and right images have already been determined, the 3D coordinates can be calculated backward.

Figure 7A:
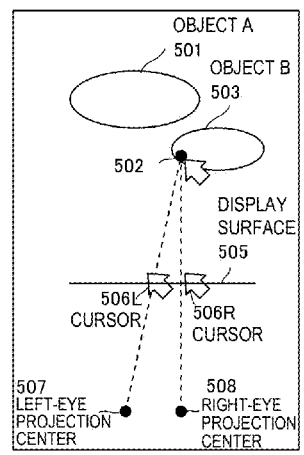
FIGS. 7A-7D illustrate method for calculating 3D coordinates according to the first exemplary embodiment.
Figure 7B:
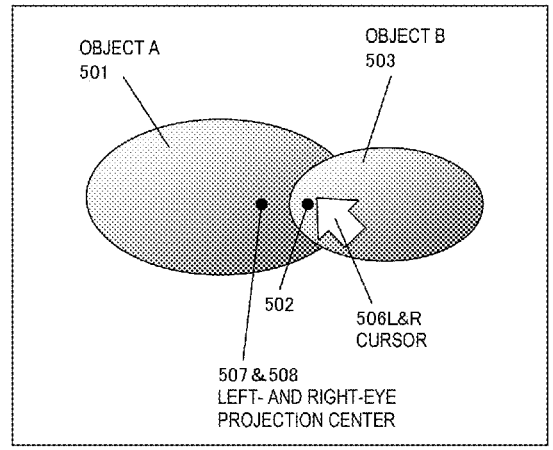
Figure 7C:
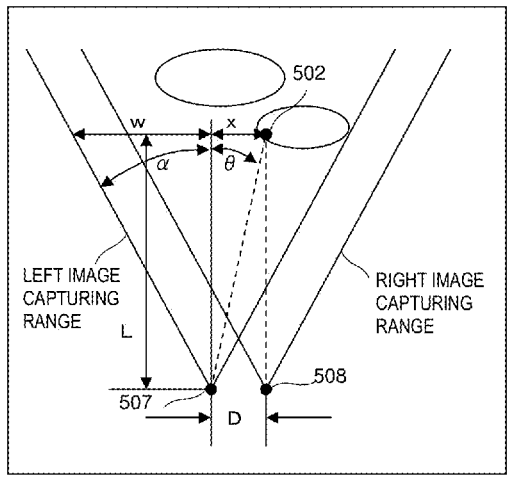
Figure 7D:
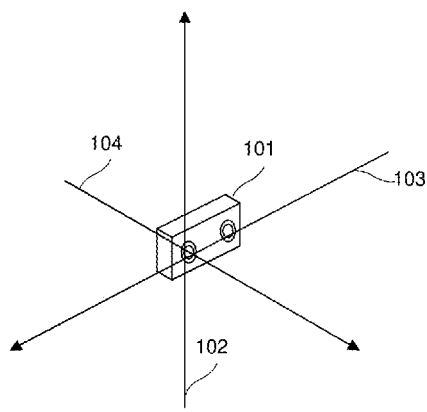

FIGS. 7A-7D illustrate method for calculating the 3D coordinates according to the first exemplary embodiment. FIGS. 7A-7D illustrate the same case as illustrated in FIGS. 2A and 2B that have already been described. Namely, FIGS. 7A and 7B are the same as FIGS. 2A and 2B. FIG. 7D illustrates a 3D coordinate system in which a coordinate axis is given to each of a vertical direction 102, a horizontal direction 103, and a depth direction 104 of a camera 101. FIG. 7C is a diagram illustrating a plane that extends in the horizontal and depth directions and that is viewed from above (namely, FIG. 7C is a plan view). Since the lenses and image sensors of a camera are fixedly mounted on an apparatus, the angle of view ($=2\alpha$) is a fixed value. Since the dot number ($=2w$) corresponding to the angle of view is also a fixed value that depends on the display system of the apparatus, an angle $\theta$ that the cursor position (operating point) 502 on the left image forms from the front of a corresponding lens can be calculated on the basis of the dot number from the center. The same applies to the right side. In addition, the distance D between the two lenses (507, 508) is a known and fixed value unique to the apparatus. Thus, since the one side and the angle formed by the two ends of the side are determined, the triangle formed by the cursor position 502 and the two lenses (507, 508) is determined uniquely. A distance L to the cursor position 502 in the real world is obtained on the basis of the length D of the apparatus, and the coordinate values in the depth direction are determined. If the distance L is determined, the distance to a dot X in the real world can be calculated backward, and the distance can be used for the coordinates in the horizontal direction. In addition, by using a proportionality constant between the dot and the distance in the real world, the coordinates in the vertical direction are also determined. As a result, the coordinates in the 3D space are determined. In this way, without calculating the 3D coordinates, the 3D image display device according to the present exemplary embodiment draws a cursor whose depth direction matches. This does not mean that the coordinates in the 3D space cannot be acquired. The present invention can be used as a measurement method in 3D space.

As described above, when a user is moving a cursor, the 3D image display device according to the first exemplary embodiment displays only one cursor for a target object. Thus, simple and easy operations can be performed. In addition, since the cursor can be displayed on an image for the user's dominant eye, an operation system that causes less burden can be provided. In addition, after the user ends the movement operation, the 3D image display device automatically performs a search on the basis of an image feature, searches for a corresponding position on an image for the other eye, and displays a cursor on the image for the other eye. Thus, while the 3D image display device requires light processing load, the user can easily indicate a cursor position having a matching depth and can visually check the spatial position.

In addition, the 3D spatial coordinates can be acquired by using the result of this series of operations. Thus, it is possible to provide an apparatus that can indicate coordinates in the 3D space only by indicating a position in the two dimensional space. If the apparatus is used for a measurement apparatus or the like, since an input operation of one dimension can be omitted, the operability of the apparatus can be improved.

Second Exemplary Embodiment

Figure 8A:
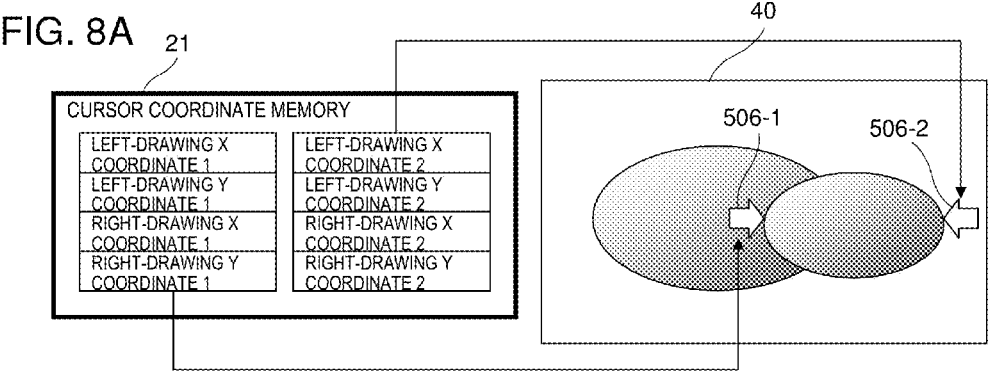
FIGS. 8A-8E illustrate operation according to a second exemplary embodiment.

FIGS. 8A-8E illustrate 3D image display device according to a second exemplary embodiment. The overall configuration of the 3D image display device according to the second exemplary embodiment is similar to that of the 3D image display device 10 according to the first exemplary embodiment illustrated in FIG. 1A. However, as illustrated in FIG. 8A, the 3D image display device according to the second exemplary embodiment differs from the 3D image display device according to the first exemplary embodiment in that coordinates of a plurality of cursors are stored in the cursor coordinate memory 21 and positions are indicated by using the plurality of cursors. Hereinafter, only the different points between the 3D image display devices according to the first and second exemplary embodiments will be described. The description of the same configurations and operations as those according to the first exemplary embodiment will be omitted.

As illustrated in FIG. 8A, in the 3D image display device according to the second exemplary embodiment, the cursor coordinate memory 21 is extended so that two cursors can be simultaneously operated and displayed. This apparatus is configured on the assumption that a user performs an operation of indicating an area sandwiched by two cursors. As illustrated in FIG. 8A, coordinate system 1 indicates the drawing position of a left-side cursor 506-1 and coordinate system 2 indicates the drawing position of a right-side cursor 506-2. In addition, since a drawing position in the left image memory and a drawing position in the right image memory are required for each of the cursor 506-1 and the cursor 506-2, the cursor coordinate memory 21 stores a total of four points of cursor drawing coordinates.

Unlike the 3D image display device according to the first exemplary embodiment, when acquiring a search image around the position of a cursor, the 3D image display device according to the second exemplary embodiment does not forward an image around the position of the head of the cursor in an image memory but forwards an image ahead of the head of the cursor. This operation is possible because there is a property that, when an area is indicated by two cursors, a target position exists in the area sandwiched by the two cursors. In the second exemplary embodiment, this property is used to extract a search image.

Namely, in addition to extracting an image near a position indicated by a cursor, the 3D image display device according to the second exemplary embodiment extracts images near the positions indicated by cursors from an image in an area indicated by a plurality of cursors.

Figure 8B:
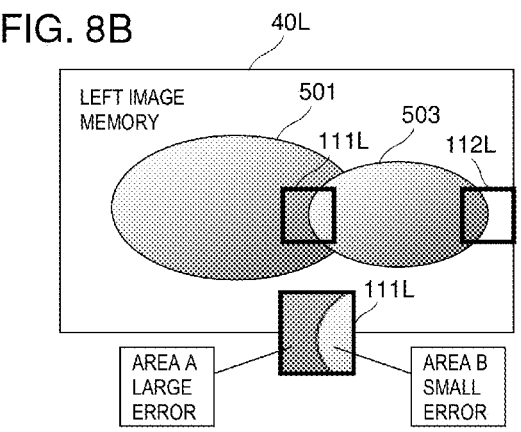
Figure 8C:
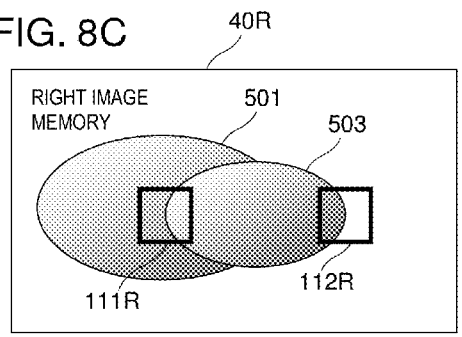

FIGS. 8B and 8C are diagrams for comparison. FIGS. 8B and 8C illustrate a case in which images near the positions indicated by cursors are simply extracted. The dominant eye is the left eye, and in the left image memory 40L in FIG. 8B, the cursors are positioned as illustrated by the cursors 506-1 and 506-2 in the image memory 40 in FIG. 8A and indicate the left and right ends of the object B (503). In FIG. 8B, the images extracted from the left image memory 40L to the search image memory 31 are denoted by reference characters 111L and 112L. The reference character 111L denotes an image near the head of the cursor 506-1 and the reference character 112L denotes an image near the head of the cursor 506-2. In FIG. 8C, the images in the right image memory 40R that correspond to the areas in the images 111L and 112L are denoted by reference characters 111R and 112R, respectively. As illustrated by the enlarged view of the image 111L in FIG. 8B, area A of the object A (501) is large in the extracted image 111L. While the cursor 506-1 indicates the left end of the object B (503), since area A of the object A (501) is large in the extracted image 111L, the area of area B, which is the right-side oval portion [object B (503)] for which perfect matching can be expected during a search, is small. This means that a search image includes many noise components.

Figure 8D:
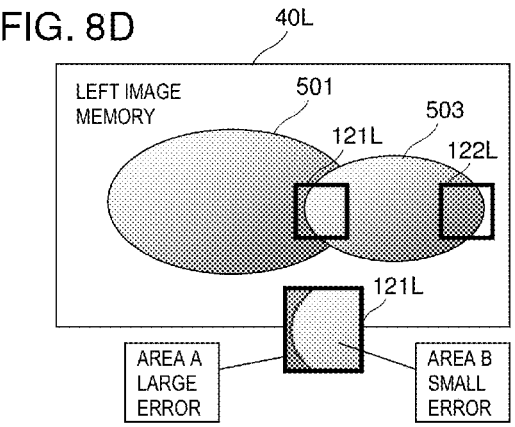
Figure 8E:
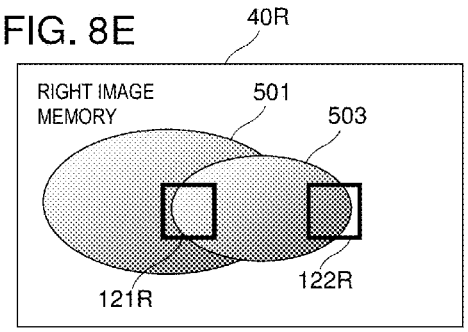

FIGS. 8D and 8E illustrate a case in which the 3D image display device according to the second exemplary embodiment extracts images near the positions indicated by cursors from an image in an area indicated by the plurality of cursors, in addition to extracting an image near the position indicated by a cursor. In FIG. 8D, the images extracted from the left image memory 40L to the search image memory 31 are denoted by reference characters 121L and 122L. In FIG. 8E, images in the right image memory 40R that correspond to the images 121L and 122L are denoted by reference characters 121R and 122R, respectively. FIG. 8D illustrates an enlarged view of the image 121L. As illustrated by the enlarged view of the image 121L, area A causing a large error is smaller and area B is larger, to extract the area ahead of the head of the cursor. The accuracy of a search can be improved by this difference in the area extracted.

Figure 9B:
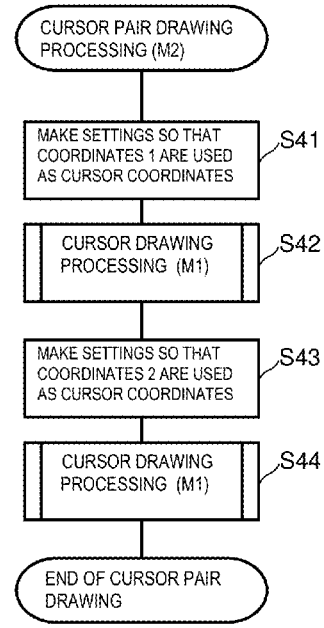
FIGS. 9A and 9B are flowchart illustrating processing according to the second exemplary embodiment.
Figure 9A:
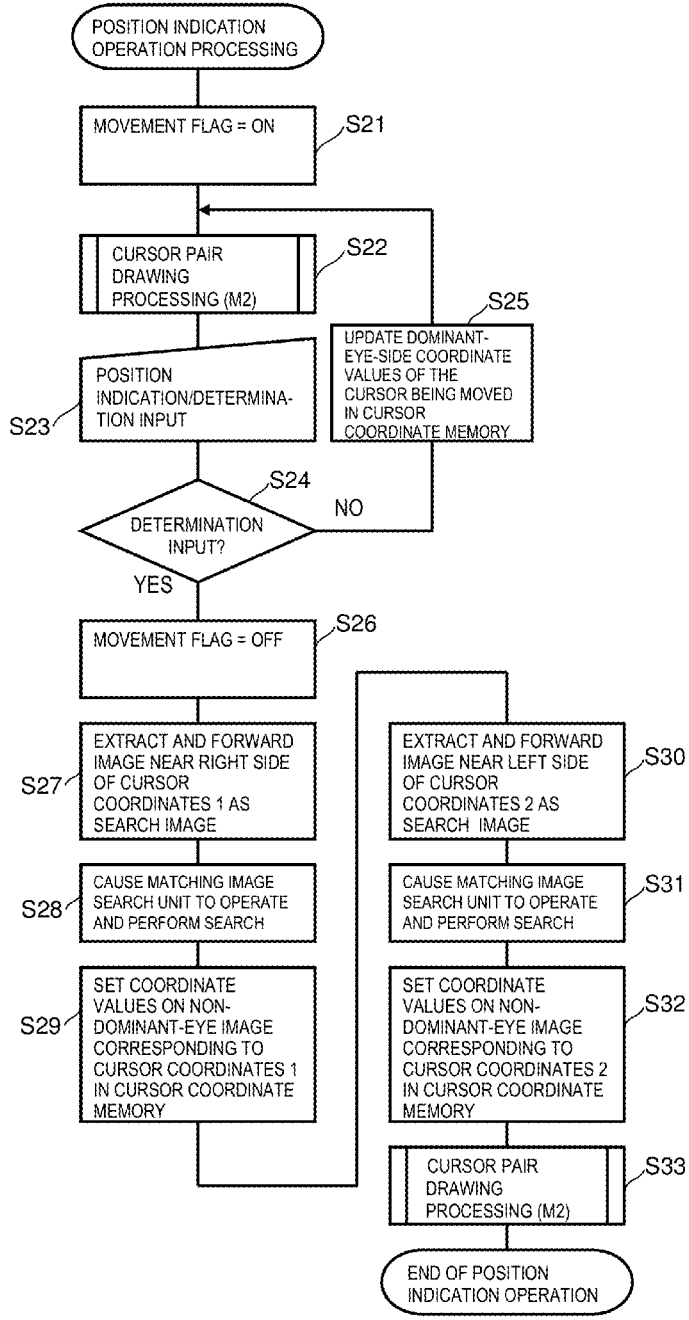

FIGS. 9A and 9B are flowchart illustrating an operation according to the second exemplary embodiment. In the second exemplary embodiment, cursor pair drawing processing (M2) is performed as cursor drawing processing. The 3D image display device is configured to call the cursor drawing processing (see FIG. 6B) while switching coordinates 1 and coordinates 2 in the flowchart illustrated in FIG. 9B. Thus, during movement of a cursor, whether the user is operating either one of the cursors, the user does not view two cursor images and can perform an operation easily. In addition, after the positions of the cursors are determined, search processing is performed for each of the two cursors, and coordinates obtained in view of the direction of each cursor are extracted and forwarded to a search image. Thus, a search can be performed accurately for the intended use.

The flowchart in FIGS. 9A and 9B will be described in more detail. As illustrated in FIG. 9A, when either the cursor 506-1 or the 506-2 (see FIG. 8A) is moved, the movement flag 24 is set to ON in step S21. Next, loop processing of steps S22 to S25 is repeated. In step S22, cursor pair drawing processing (M2) is performed. FIG. 9B illustrates detailed steps of the cursor pair drawing processing (M2). In step S41, between the coordinates for the cursor 506-1 and the coordinates for the cursor 506-2 stored in the cursor coordinate memory 21, settings are made so that the coordinates 1, which are the coordinate system for the cursor 506-1, are used. Next, in step S42, the cursor drawing processing (M1) is performed. The cursor drawing processing (M1) has already been described with reference to FIG. 6B. Next, in step S43, settings are made so that the coordinates 2, which are the coordinate system for the cursor 506-2, are used. Next, in step S44, the cursor drawing processing (M1) is performed again. Namely, in the cursor pair drawing processing (M2), the cursor drawing processing (M1) is performed for two cursors in steps S42 and S44.

The flowchart in FIG. 9A will be further described. In step S23, the 3D image display device waits for a user input for indicating movement of a cursor or a user input for determining the positions of the cursors from the operation unit 70. If the 3D image display device receives an input for indicating movement of a cursor or an input for determining the positions from the operation unit 70, the operation proceeds to step S24. If the 3D image display device does not receive an input for determining the positions (if the 3D image display device receives an input for indicating a movement position), the operation proceeds to step S25. In step S25, between the coordinates of the two cursors stored in the cursor coordinate memory 21, the coordinate values of the cursor being moved are updated. While the coordinate values of the cursor being moved include the left-drawing coordinates and right-drawing coordinates, the coordinate values corresponding to the dominant eye are updated. Next, the operation returns to step S22, and the same processing is repeated.

In step S24, if the 3D image display device receives an input for determining the positions, the operation proceeds to the processing from steps S26 to S33. In step S26, the movement flag 24 is set to OFF. Next, the coordinates near the right side (in the direction of the coordinates 2) of the coordinates 1, which are the coordinates for the cursor 506-1 (see FIG. 8A), are extracted and forwarded as a search image in the search image memory 31 (step S27). Next, the matching image search unit 32 is caused to operate and perform a search (step S28). Next, on the basis of the search result, the coordinate values are set on the non-dominant-eye image corresponding to the cursor coordinates 1 in the cursor coordinate memory 21 (step S29). Next, the coordinates near the left side (in the direction of the coordinates 1) of the coordinates 2, which are the coordinates for the cursor 506-2, are extracted and forwarded as a search image in the search image memory 31 (step S30). Next, a matching image is searched for (step S31). Next, the coordinate values are set on the non-dominant eye image corresponding to the cursor coordinates 2 (step S32). Finally, in step S33, the cursor pair drawing processing (M2) is performed. In this way, the position indication operation is ended.

Third Exemplary Embodiment

In the second exemplary embodiment, the accuracy is improved by using the property that a target portion exists in the inside of (in the area sandwiched by) two cursors. In a third exemplary embodiment, the mechanism for improving the accuracy is applicable even when only one cursor is used. A feature of the third exemplary embodiment is that a cursor can indicate a direction.

Figure 10A:
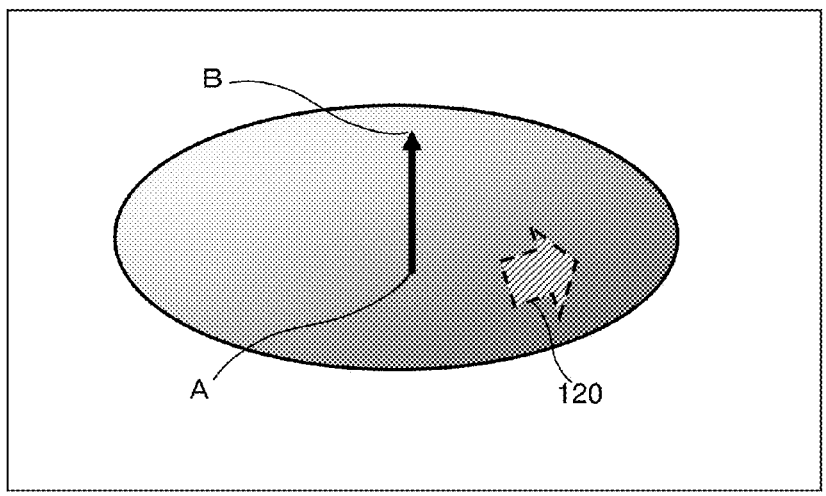
FIGS. 10A-10C illustrate indication of a cursor direction according to a third exemplary embodiment.
Figure 10B:
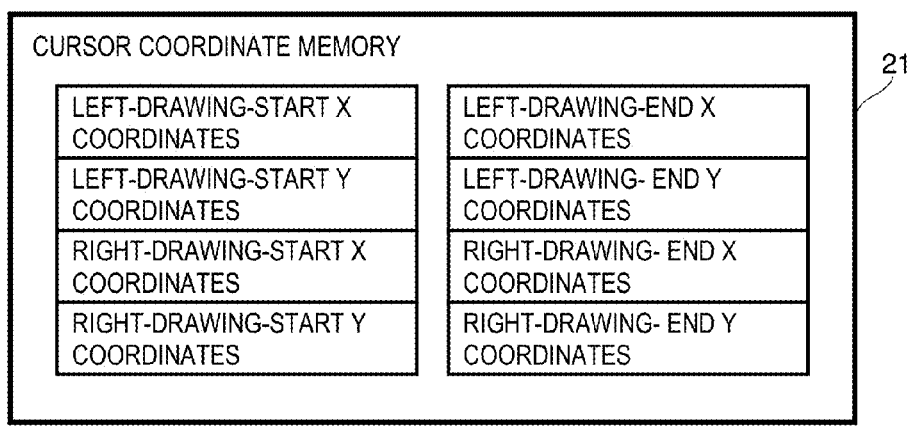
Figure 10C:
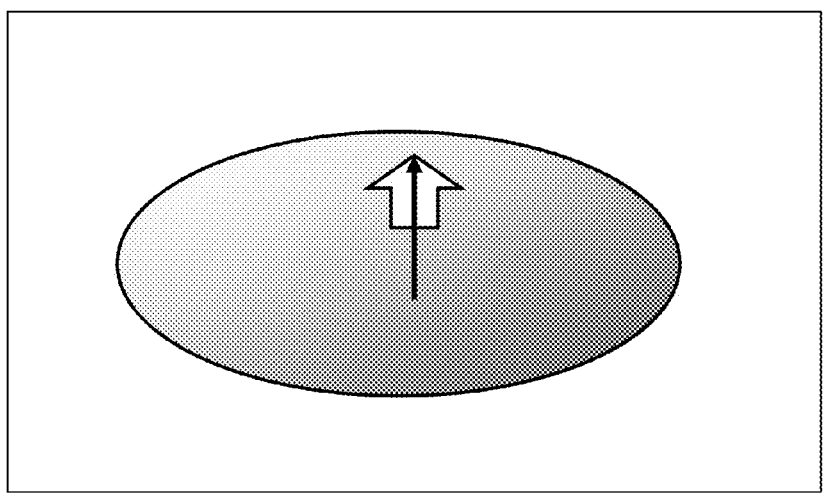

FIGS. 10A-10C illustrate configuration feature of a 3D image display device according to the third exemplary embodiment and a cursor indication operation and processing thereof. An overall configuration of the 3D image display device according to the third exemplary embodiment is similar to that of the 3D image display device 10 according to the first exemplary embodiment illustrated in FIG. 1A. However, as illustrated in FIG. 10B, the 3D image display device according to the third exemplary embodiment is different in that the cursor coordinate memory 21 stores drawing-start and drawing-end coordinates to indicate a cursor direction.

Next, a cursor indication operation according to the third exemplary embodiment will be described with reference to FIGS. 10A and 10C. In FIG. 10A, a cursor currently being operated exists at a shaded position 120. When indicating an updated cursor position, the user starts a dragging operation at a point A to indicate a direction and ends the dragging operation at a point B to indicate the updated position. In this case, the point A is set as the left-drawing-start coordinates in the cursor coordinate memory (if the dominant eye is the left eye) and the point B is set as the left-drawing-end coordinates. When a cursor is drawn, this end point corresponds to the head of the cursor. As a result, a cursor in line with the start point as illustrated in FIG. 10C is drawn. This indication method is only an example. Alternatively, the user may input the head and direction of the cursor by indicating coordinates of the head and by indicating the direction through a flick operation (an operation in which the user first points coordinates of the cursor head with his/her finger or the like and quickly moves and releases the finger). The following description will be made by illustrating the above input method in which the direction is indicated by the start and end points of a dragging operation.

Figure 11:
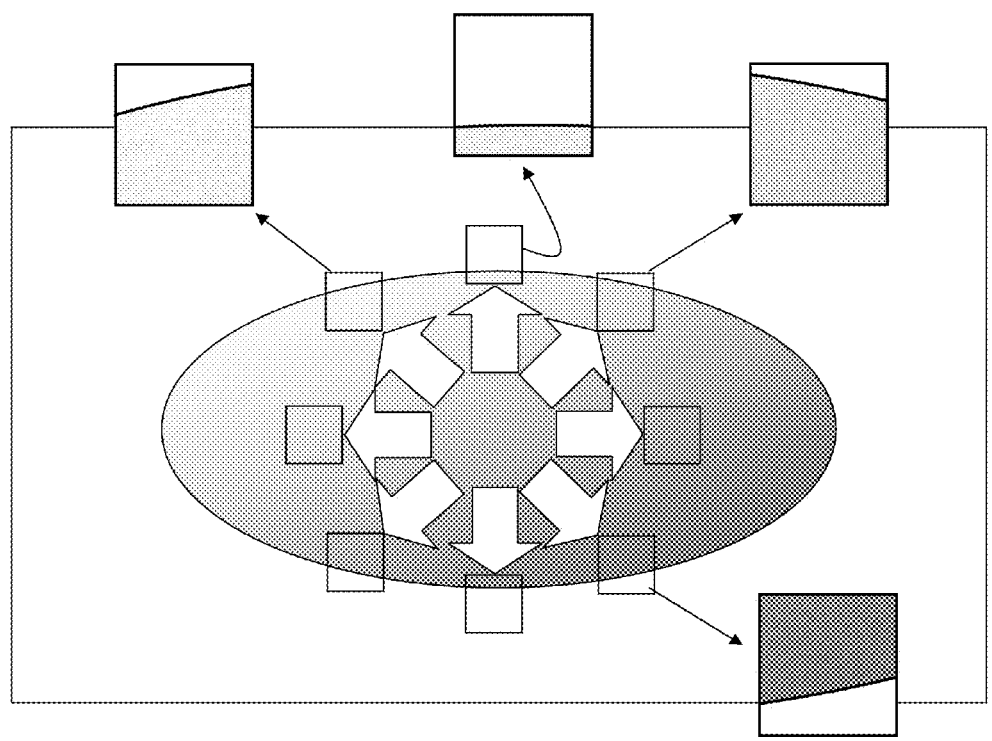
FIG. 11 illustrates extraction of a search image by indicating a position and a direction according to the third exemplary embodiment.

As in the second exemplary embodiment, in the third exemplary embodiment, when acquiring a search image around a cursor portion, an image around the position of the cursor head in an image memory is not simply forwarded to the search image memory 31. An image ahead of the cursor head is extracted and forwarded to the search image memory 31. However, unlike the second exemplary embodiment, since the direction is arbitrary, as illustrated in FIG. 11, the position of an image to be extracted differs depending on the direction of the cursor. FIG. 11 illustrates eight directions. However, in practice, processing for an arbitrary direction can be performed, for example, by determining a rule that a cursor head comes into contact with at least one of the four sides and the center coordinates are located on a line that extends in the cursor direction and by performing a calculation. In accordance with this extraction method, as in the second exemplary embodiment, an image having less noise components can be obtained as a search source. Thus, the accuracy in searching for an image for the non-dominant eye can be improved.

Figure 12:
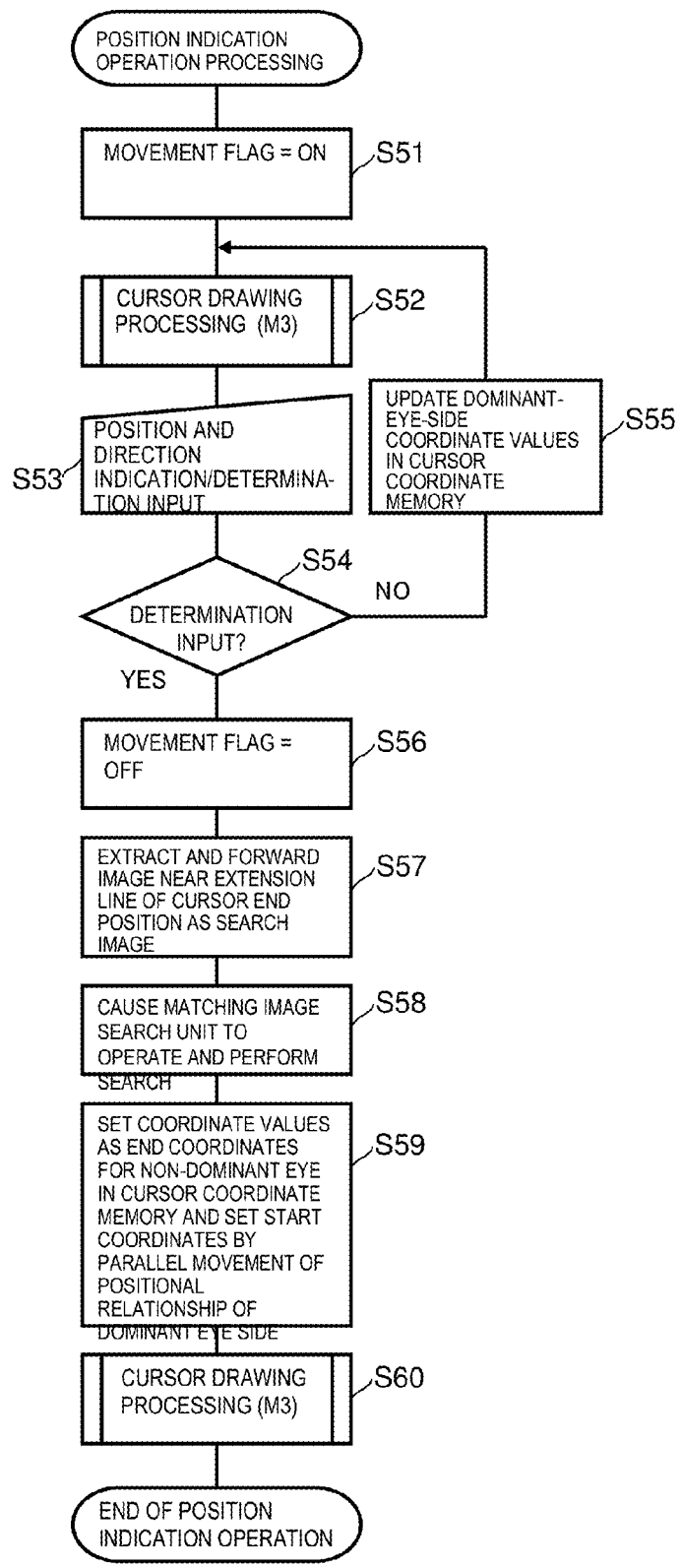
FIG. 12 is a flowchart illustrating overall processing according to the third exemplary embodiment.

Next, processing according to the third exemplary embodiment will be described with reference to a flowchart. FIG. 12 is a flowchart illustrating an overall position indication operation according to the third exemplary embodiment. The third exemplary embodiment differs from the first exemplary embodiment in the processing for extracting a search image. In addition, in the third exemplary embodiment, when cursor coordinates are set on an image for the non-dominant eye on the basis of the search result, an offset is performed on the resultant coordinates in view of a direction. In addition, to draw a cursor in view of a direction in cursor drawing processing, processing for generating cursor image data is added.

Figure 13A:
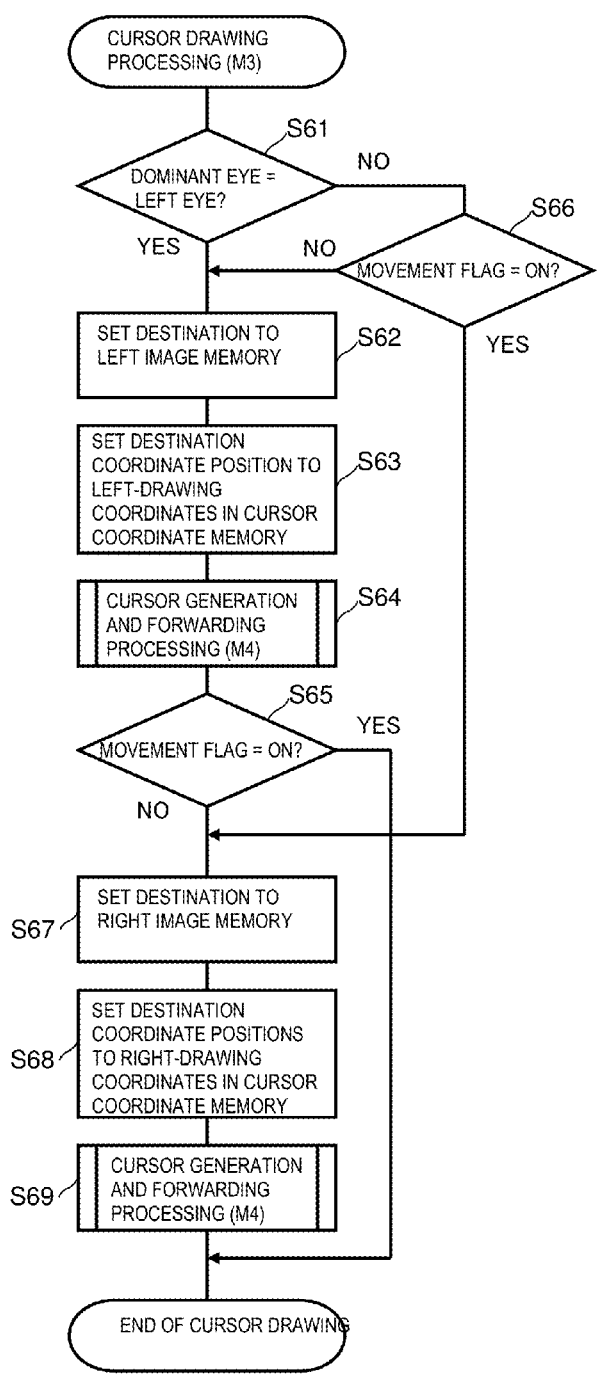
FIGS. 13A and 13B are flowchart illustrating cursor drawing processing according to the third exemplary embodiment.
Figure 13B:
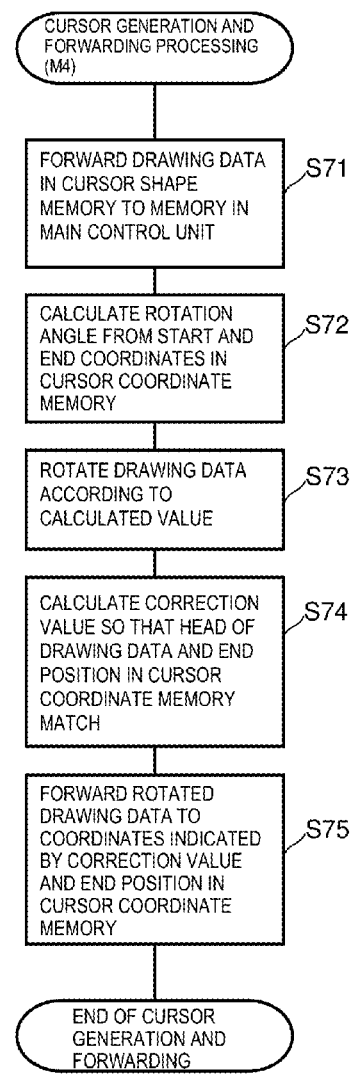

First, in FIG. 12, after the position is determined, an image located near an extension line of the cursor end position is extracted and forwarded as a search image in step S57. This is the operation illustrated in FIG. 11. A search is performed on the basis of this image, and the obtained coordinates are the image coordinates near an extension line of the cursor end position on an image for the non-dominant eye. Thus, an offset opposite to the offset illustrated in FIG. 11 is performed, and the obtained coordinates are set as the coordinates at the cursor head. The coordinates are set as the end point in the coordinate memory. In addition, the coordinates of the start point can be set by obtaining a line that is parallel to the line running from the end point to the start point on the dominant-eye image and by setting the distance between these start and end points on the image for the non-dominant eye to be the same as the distance between the start and end points on the image for the dominant eye (step S59). In this way, when displaying a cursor for the non-dominant eye, the 3D image display device can display a cursor not only having a depth matching the image but also having the same arrow shape as that of the cursor on the image for the dominant eye. FIG. 13A illustrates details of cursor drawing processing (M3) performed in steps S52 and S60 in FIG. 12. In the cursor drawing processing (M1; see FIG. 6B) according to the first exemplary embodiment, drawing data in the cursor shape memory is simply forwarded in step S19. However, in the cursor drawing processing (M33) according to the third exemplary embodiment, this step is extended to cursor generation and forwarding processing (M4) in step S69. FIG. 13B illustrates details of the processing. In the cursor generation and forwarding processing (M4) in FIG. 13B, first, a cursor image pattern is generated in accordance with a direction (steps S71 to S73). This generation is performed by using the memory 61 in the main control unit 60. The content in the cursor shape memory 22 is forwarded (step S71), and image processing is performed in accordance with the start and end coordinates to rotate the data (steps S72 and S73). In addition, since the coordinates of the head is rotated when the cursor is drawn, a correction value for correcting the rotation is calculated and forwarded (steps S74 and S75). In this way, a cursor having its head at indicated coordinates and having an indicated rotation angle is drawn.

According to the third exemplary embodiment, when searching for an image for the non-dominant eye, the 3D image display device can use an image having less noise components. Thus, search accuracy can be improved. In addition, since an arbitrary direction can be set and the cursor display direction matches the set direction, an object on the screen can be indicated accurately and the freedom of the method for indicating a cursor can be increased, counted as advantageous effects.

The configuration of the 3D image display device illustrated in FIGS. 1A-1c is suitable example of a 3D image display device disclosed in the present disclosure. An arbitrary configuration can be used. For example, the 3D image display device does not necessarily include cameras such as the left camera unit 50L and the right camera unit 50R. The present disclosure is applicable to a device that receives a pseudo 3D image from the outside or displays a pseudo 3D image created by animation. In addition, part or all of the processing performed by the main control unit 60 may be performed by the image analysis unit 30 or the cursor drawing control unit 20. Alternatively, part or all of the processing performed by the image analysis unit 30 and the cursor drawing control unit 20 may be performed by the main control unit 60. Namely, the present invention is applicable as long as there is means that performs functions of the image analysis unit 30, the cursor drawing control unit 20, and the main control unit 60 by using some hardware and/or software.

The 3D image display device according to any one of the first to third exemplary embodiments is applicable not only to a general image display device but also to a mobile phone, a smartphone, and another device (for example, a game machine, a tablet PC (Personal Computer), a laptop PC, or a PDA (Personal Data Assistants: mobile information terminal)) that can display 3D images. In addition, the 3D image display device can be used for indicating a position in a 3D image on a CAD device, a telesurgery device, and a remote diagnosis and treatment device that create 3D images. Namely, the present disclosure is applicable to an arbitrary device that indicates a position by using a cursor (a generic name of a position indication marker such as a pointer) and that displays a pseudo 3D image by using binocular parallax.

In addition, while each cursor has an arrow shape in each exemplary embodiment, each cursor may have an arbitrary shape. As long as each cursor is a symbol that can indicate a position (direction) on a screen. For example, if the direction of the cursor is fixed as in the first and second exemplary embodiments, in the first mode in which a cursor is displayed for only one eye, the position of the cursor may be displayed at the intersection of two straight lines, one being a horizontal line and the other being a vertical line, which are in parallel to the display surface and which are perpendicular to each other. In the second mode in which a 3D cursor is displayed with a depth, a cursor indicating a position may be displayed at the intersection of three straight lines, one being a horizontal line, one being a vertical line, and the other being a line perpendicular to the display surface and running in the depth direction, which are perpendicular to each other.

In addition, arbitrary means, such as a mouse, a trackball, a key, a switch, or a touch panel, may of course be used as the cursor position (direction) indication means.

In the exemplary embodiments, when a cursor is moving, the first mode in which a cursor is displayed for one eye is used, and when the position of a cursor is determined, the second mode in which a 3D cursor is displayed is used. However, switching between the first mode and the second mode may be performed by an arbitrary operation or at an arbitrary timing. According to each of the above exemplary embodiments, when cursor display is switched from the first mode to the second mode, image matching is performed to determine a cursor display position on the image that has not been displaying a cursor. Thus, cursor display can easily be switched from the first mode (displaying a cursor for one eye) to the second mode (displaying a 3D cursor). Since switching from the second mode to the first mode can easily be performed by stopping displaying a cursor on the left- or right-eye image, description thereof will be omitted.

In addition, as suitable examples, cases where a cursor is displayed on an image for a dominant eye in the first mode have been described. However, depending on the user preference or the like, a cursor may be displayed on an image for an arbitrary eye.

Hereinafter, suitable modes relating to the present invention disclosed in the present description and the drawings will be described.

[Mode 1]
A three-dimensional image display device using binocular parallax, the device comprising:
a cursor drawing control unit controlling cursor drawing in a first mode in which a cursor is displayed on an image for one of left and right eyes and no cursor is displayed on an image for the other eye and cursor drawing in a second mode in which a cursor is displayed with a depth by using parallax of images for both left and right eyes; and
an image analysis unit performing, when cursor drawing is switched from the first mode to the second mode, image matching on the basis of a position indicated by a cursor on an image for the one eye to search for a corresponding position on an image for the other eye and obtaining a cursor display position on the image for the other eye.

[Mode 2]
The three-dimensional image display device according to mode 1; wherein the image analysis unit extracts an image near a position indicated by a cursor on an image for the one eye, extracts an image similar to the extracted image from an image for the other eye, and determines a cursor display position on the image for the other eye.

[Mode 3]
The three-dimensional image display device according to mode 1 or 2;
wherein the cursor drawing control unit controls cursor drawing so that a plurality of cursors are simultaneously displayed on a single image; and
wherein the image analysis unit extracts an image in an area indicated by the plurality of cursors on an image for the one eye, extracts an image similar to the extracted image from an image for the other eye, and determines a cursor display position on the image for the other eye.

[Mode 4]
The three-dimensional image display device according to any one of modes 1 to 3;
wherein the cursor drawing control unit controls display of a cursor that indicates a position and a direction; and
wherein the image analysis unit extracts an image on the basis of a position and a direction indicated by a cursor on an image for the one eye, extracts an image similar to the extracted image from an image for the other eye, and determines a cursor display position and direction on the image for the other eye.

[Mode 5]
The three-dimensional image display device according to any one of modes 1 to 4;
wherein the cursor drawing control unit controls cursor drawing so that cursor drawing in the first mode is performed when the cursor is moved and so that cursor drawing in the second mode is performed when the cursor is stopped.

[Mode 6]
The three-dimensional image display device according to any one of modes 1 to 5, comprising:
a left-eye image memory and a right-eye image memory;
wherein, when controlling cursor drawing in the first mode, the cursor drawing control unit controls the cursor drawing for one of the left- and right-eye image memories; and
wherein, when switching cursor drawing from the first mode to the second mode, the cursor drawing control unit controls cursor drawing for the image memory for the other eye on the basis of a cursor display position on an image for the other eye obtained by the image analysis unit.

[Mode 7]
The three-dimensional image display device according to any one of modes 1 to 6;
wherein a dominant eye can be set as the one eye when cursor drawing in the first mode is performed.

[Mode 8]
The three-dimensional image display device according to any one of modes 1 to 7, further comprising a means for calculating, when cursor drawing in the second mode is performed, three-dimensional spatial coordinates of a position indicated by a cursor on the basis of a cursor display position on a left-eye image, a cursor display position on a right-eye image, and a distance between a viewpoint for the left-eye image and a viewpoint for the right-eye image.

[Mode 9]
A cursor display method for a three-dimensional image display device using binocular parallax, the method comprising:
detecting, when cursor drawing is switched from a first mode in which a cursor is displayed on an image for one of left and right eyes and no cursor is displayed on an image for the other eye to a second mode in which a three-dimensional cursor is displayed by using parallax of images for both left and right eyes, a position of an image indicated by the cursor on the image for the one eye, performing image matching to search for a corresponding position on an image for the other eye, and displaying a cursor on the image for the other eye on the basis of the position searched for.

[Mode 10]
The cursor display method according to mode 9;
wherein, in the first mode, a cursor can be displayed on an image for a dominant eye, which is a left-eye image or a right-eye image.

[Mode 11]
The cursor display method according to mode 9 or 10;
wherein, when cursor drawing is switched from the first mode to the second mode, an image near a position indicated by a cursor on an image for the one eye is extracted, an image similar to the extracted image is extracted from an image for the other eye, and a cursor display position on the image for the other eye is determined.

[Mode 12]
The cursor display method according to any one of modes 9 to 11;
wherein, when a plurality of cursors are simultaneously displayed on a single image and cursor display is switched from the first mode to the second mode, an image in an area indicated by the plurality of cursors on an image for the one eye is extracted, an image similar to the extracted image is extracted from an image for the other eye, and a cursor display position on the image for the other eye is determined.

[Mode 13]
The cursor display method according to any one of modes 9 to 12;
wherein, when the cursor is a cursor indicating a position and a direction and cursor display is switched from the first mode to the second mode, an image on the basis of a position and a direction indicated by a cursor on an image for the one eye is extracted, an image similar to the extracted image is extracted from an image for the other eye, and a cursor display position and direction on the image for the other eye are determined.

[Mode 14]
The cursor display method according to any one of modes 9 to 13;

wherein cursor display is controlled so that cursor drawing in the first mode is performed when the cursor is moved and so that cursor drawing in the second mode is performed when the cursor is stopped.

[Mode 15]

The cursor display method according to any one of modes 9 to 14;
wherein, in the second mode, three-dimensional spatial coordinates of a position indicated by a cursor are calculated on the basis of a cursor display position on a left-eye image, a cursor display position on a right-eye image, and a distance between a viewpoint for the left-eye image and a viewpoint for the right-eye image.

[Mode 16]

A computer program, causing a computer of a three-dimensional image display device using binocular parallax to perform cursor display processing, the computer program comprising:
display processing in a first mode for displaying a cursor on an image for one of left and right eyes and hiding a cursor on an image for the other eye;
display processing in a second mode for displaying a cursor with a depth by using parallax of images for both left and right eyes; and
processing for performing, when display is switched from the first mode to the second mode, image matching on the basis of a position indicated by a cursor on an image for the one eye to search for a corresponding position on an image for the other eye, obtaining a cursor display position on the image for the other eye, and switching to display in the second mode.

[Mode 17]

The computer program according to mode 16;
wherein, in the processing for switching to display in the second mode, an image near a position indicated by a cursor on an image for the one eye is extracted, an image similar to the extracted image is extracted from an image for the other eye, and a cursor display position on the image for the other eye is determined.

[Mode 18]

The computer program according to mode 16 or 17;
wherein, in the processing for switching to display in the second mode, a plurality of cursors are simultaneously displayed on a single image, an image in an area indicated by the plurality of cursors on an image for the one eye is extracted, an image similar to the extracted image is extracted from an image for the other eye, and a cursor display position on the image for the other eye is determined.

[Mode 19]

The computer program according to any one of modes 16 to 18;
wherein, in the processing for switching to display in the second mode, a cursor indicating a position and a direction is displayed, an image on the basis of a position and a direction indicated by a cursor on an image for the one eye is extracted, an image similar to the extracted image is extracted from an image for the other eye, and a cursor display position and direction on the image for the other eye are determined.

[Mode 20]

The computer program according to any one of modes 16 to 19;
wherein cursor display processing in the first mode is performed when the cursor is moved and cursor display processing in the second mode is performed when the cursor is stopped.

[Mode 21]

The computer program according to any one of modes 16 to 19;
wherein processing for setting a dominant eye as one of the left and right eyes is performed; and
wherein, in display processing in the first mode, a cursor is displayed on an image for an eye set as the dominant eye.

[Mode 22]

The computer program according to any one of modes 16 to 21, further comprising:
processing for calculating, in the second mode, three-dimensional spatial coordinates of a position indicated by a cursor on the basis of a cursor display position on a left-eye image, a cursor display position on a right-eye image, and a distance between a viewpoint for the left-eye image and a viewpoint for the right-eye image.

[Mode 23]

A three-dimensional image display device, detecting, when switching cursor display from a first mode in which a cursor is displayed on an image for one of left and right eyes and no cursor is displayed on an image for the other eye to a second mode in which a three-dimensional cursor is displayed by using parallax of images for both left and right eyes, a position on an image indicated by a cursor on an image for the one eye, performing image matching to search for a corresponding position on an image for the other eye, and displaying a cursor at the position searched for on the image for the other eye.

[Mode 24]

A computer program, causing a computer to function as the three-dimensional image display device according to any one of modes 1 to 8 and 23.

[Mode 25]

A computer-readable recording medium storing the computer program according to any one of modes 16 to 22 and 24.

Modifications and adjustments of the examples and the examples are possible within the scope of the overall disclosure (including the claims and the drawings) of the present invention and based on the basic technical concept of the present invention. In addition, various combinations and selections of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the drawings and the technical concept. In particular, the present description discloses numerical value ranges. However, even if the description does not particularly disclose arbitrary numerical values or small ranges included in the ranges, these values and ranges should be deemed to have been specifically disclosed.

10: three-dimensional (3D) image display device (portable terminal device)
20: cursor drawing control unit
21: cursor coordinate memory
22: cursor shape memory
23: dominant eye setting memory
24: movement flag
30: image analysis unit
31: search image memory
32: matching image search unit
40: image memory
40L: (left) image memory
40R: (right) image memory
41: camera data buffer 42: processing and drawing data buffer
50L: left camera unit
50R: right camera unit
60: main control unit
61: memory [program memory, data memory (control data)]
70: operation unit
80: 3D display control unit
90: 3D display unit
101: camera
102 to 104: coordinate axis
111L, 111R, 112L, 112R, 121L, 121R, 122L, 122R: image
120, 506-1, 506-2: cursor
501: object A
502, 504: operating point (a position where it appears that a cursor head overlaps an object; a cursor position)
503: object B
505: display surface
506L: cursor (on an image display surface for a left eye)
506R: cursor (on an image display surface for a right eye)
507: left-eye projection center (lens)
508: right-eye projection center (lens)

The invention claimed is:

1. A three-dimensional image display device using binocular parallax, the device comprising:
a cursor drawing control unit controlling cursor drawing in a first mode in which a cursor is displayed on an image for one of left and right eyes and no cursor is displayed on an image for the other eye of the left and right eyes and cursor drawing in a second mode in which a cursor is displayed with a depth by using parallax of images for both the left and right eyes; and
an image analysis unit performing, when cursor drawing is switched from the first mode to the second mode, image matching on the basis of a position indicated by a cursor on an image for the one eye to search for a corresponding position on an image for the other eye and obtaining a cursor display position on the image for the other eye,
wherein the cursor drawing control unit controls cursor drawing so that cursor drawing in the first mode is performed when the cursor is moved and so that cursor drawing in the second mode is performed when the cursor is stopped.

2. The three-dimensional image display device according to claim 1,
wherein the image analysis unit extracts an image near a position indicated by a cursor on an image for the one eye, extracts an image similar to the extracted image from an image for the other eye, and determines a cursor display position on the image for the other eye.

3. The three-dimensional image display device according to claim 1,
wherein the cursor drawing control unit controls cursor drawing so that a plurality of cursors are simultaneously displayed on a single image, and
wherein the image analysis unit extracts an image in an area indicated by the plurality of cursors on an image for the one eye, extracts an image similar to the extracted image from an image for the other eye, and determines a cursor display position on the image for the other eye.

4. The three-dimensional image display device according to claim 1,
wherein the cursor drawing control unit controls display of a cursor that indicates a position and a direction, and
wherein the image analysis unit extracts an image on the basis of a position and a direction indicated by a cursor on an image for the one eye, extracts an image similar to the extracted image from an image for the other eye, and determines a cursor display position and direction on the image for the other eye.

5. The three-dimensional image display device according to claim 1, comprising:
a left-eye image memory and a right-eye image memory,
wherein, when controlling cursor drawing in the first mode, the cursor drawing control unit controls the cursor drawing for one of the left- and right-eye image memories, and
wherein, when switching cursor drawing from the first mode to the second mode, the cursor drawing control unit controls cursor drawing for the image memory for the other eye on the basis of a cursor display position on an image for the other eye obtained by the image analysis unit.

6. The three-dimensional image display device according to claim 1,
wherein a dominant eye is set as the one eye when cursor drawing in the first mode is performed.

7. The three-dimensional image display device according to claim 2,
wherein the cursor drawing control unit controls cursor drawing so that a plurality of cursors are simultaneously displayed on a single image, and
wherein the image analysis unit extracts an image in an area indicated by the plurality of cursors on an image for the one eye, extracts an image similar to the extracted image from an image for the other eye, and determines a cursor display position on the image for the other eye.

8. The three-dimensional image display device according to claim 2,
wherein the cursor drawing control unit controls display of a cursor that indicates a position and a direction, and
wherein the image analysis unit extracts an image on the basis of a position and a direction indicated by a cursor on an image for the one eye, extracts an image similar to the extracted image from an image for the other eye, and determines a cursor display position and direction on the image for the other eye.

9. The three-dimensional image display device according to claim 2, comprising:
a left-eye image memory and a right-eye image memory,
wherein, when controlling cursor drawing in the first mode, the cursor drawing control unit controls the cursor drawing for one of the left- and right-eye image memories, and
wherein, when switching cursor drawing from the first mode to the second mode, the cursor drawing control unit controls cursor drawing for the image memory for the other eye on the basis of a cursor display position on an image for the other eye obtained by the image analysis unit.

10. The three-dimensional image display device according to claim 3,
wherein the cursor drawing control unit controls display of a cursor that indicates a position and a direction, and
wherein the image analysis unit extracts an image on the basis of a position and a direction indicated by a cursor on an image for the one eye, extracts an image similar to the extracted image from an image for the other eye, and determines a cursor display position and direction on the image for the other eye.

11. The three-dimensional image display device according to claim 3, comprising:

a left-eye image memory and a right-eye image memory,
wherein, when controlling cursor drawing in the first mode, the cursor drawing control unit controls the cursor drawing for one of the left- and right-eye image memories, and
wherein, when switching cursor drawing from the first mode to the second mode, the cursor drawing control unit controls cursor drawing for the image memory for the other eye on the basis of a cursor display position on an image for the other eye obtained by the image analysis unit.

12. The three-dimensional image display device according to claim 4, comprising:
a left-eye image memory and a right-eye image memory,
wherein, when controlling cursor drawing in the first mode, the cursor drawing control unit controls the cursor drawing for one of the left- and right-eye image memories, and
wherein, when switching cursor drawing from the first mode to the second mode, the cursor drawing control unit controls cursor drawing for the image memory for the other eye on the basis of a cursor display position on an image for the other eye obtained by the image analysis unit.

13. A cursor display method for a three-dimensional image display device using binocular parallax, the method comprising:
detecting, when a cursor drawing is switched from a first mode in which a cursor is displayed on an image for one of left and right eyes and no cursor is displayed on an image for the other eye of the left and right eyes to a second mode in which a three-dimensional cursor is displayed by using parallax of images for both the left and right eyes, a position of an image indicated by the cursor on the image for the one eye;
searching for a corresponding position on an image for the other eye by performing image matching; and
displaying a cursor on the image for the other eye on the basis of the position searched for,
wherein cursor drawing in the first mode is performed when the cursor is moved and cursor drawing in the second mode is performed when the cursor is stopped.

14. The cursor display method according to claim 13, further comprising,
extracting an image near a position indicated by a cursor on an image for the one eye, when cursor drawing is switched from the first mode to the second mode; and
determining a cursor display position on the image for the other eye by extracting an image similar to the extracted image from an image for the other eye.

15. A non-transitory computer-readable recording medium storing a computer program, causing a computer of a three-dimensional image display device using binocular parallax to perform cursor display processing, the computer program executing:
display processing in a first mode for displaying a cursor on an image for one of left and right eyes and hiding a cursor an image for the other eye of the left and right eyes;
display processing in a second mode for displaying a cursor with a depth by using parallax of images for both the left and right eyes; and
processing for performing, when a cursor display is switched from the first mode to the second mode, image matching on the basis of a position indicated by a cursor on an image for the one eye to search for a corresponding position on an image for the other eye, obtaining a cursor display position on the image for the other eye, and switching to display in the second mode,
wherein cursor drawing in the first mode is performed when the cursor is moved and cursor drawing in the second mode is performed when the cursor is stopped.

* * * * *